(12) United States Patent
Kim et al.

(10) Patent No.: US 11,310,495 B2
(45) Date of Patent: Apr. 19, 2022

(54) SYSTEMS AND METHODS FOR APPLYING DEBLOCKING FILTERS TO RECONSTRUCTED VIDEO DATA

(71) Applicants: Sharp Kabushiki Kaisha, Sakai (JP); FG Innovation Company Limited, New Territories (HK)

(72) Inventors: Seung-Hwan Kim, Camas, WA (US); Jie Zhao, Camas, WA (US); Kiran Mukesh Misra, Camas, WA (US); Christopher Andrew Segall, Camas, WA (US)

(73) Assignees: SHARP KABUSHIKI KAISHA, Osaka (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/337,421

(22) PCT Filed: Aug. 21, 2017

(86) PCT No.: PCT/JP2017/029755
§ 371 (c)(1),
(2) Date: Mar. 28, 2019

(87) PCT Pub. No.: WO2018/066241
PCT Pub. Date: Apr. 12, 2018

(65) Prior Publication Data
US 2019/0281294 A1     Sep. 12, 2019

Related U.S. Application Data

(60) Provisional application No. 62/403,658, filed on Oct. 3, 2016.

(51) Int. Cl.
*H04N 19/117* (2014.01)
*H04N 19/136* (2014.01)
(Continued)

(52) U.S. Cl.
CPC ......... *H04N 19/117* (2014.11); *H04N 19/136* (2014.11); *H04N 19/14* (2014.11);
(Continued)

(58) Field of Classification Search
CPC .. H04N 19/117; H04N 19/136; H04N 19/157; H04N 19/159; H04N 19/182;
(Continued)

(56) References Cited

U.S. PATENT DOCUMENTS 7,725,691 B2 * 5/2010 Stein ................... G06F 9/3001
                                                        712/226
9,591,325 B2 * 3/2017 Li ......................... H04N 19/593
(Continued)

FOREIGN PATENT DOCUMENTS

CN     102045567 A  *  5/2011  ............. H04N 19/61
CN     102045567 A     5/2011
(Continued)

OTHER PUBLICATIONS

"High Efficiency Video Coding" ITU-T H.265Recommendations Apr. 2013 (Year: 2013).*

(Continued)

*Primary Examiner* — Dramos Kalapodas
(74) *Attorney, Agent, or Firm* — Finnegan, Henderson, Farabow, Garrett & Dunnner LLP

(57) ABSTRACT

A method of filtering reconstructed video data, the method comprising: determining whether one or more conditions associated with the adjacent reconstructed video blocks are satisfied; selecting a filter based on whether the one or more conditions are satisfied; modifying sample values in the adjacent reconstructed video blocks based on the selected filter.

6 Claims, 14 Drawing Sheets

(51) Int. Cl.
*H04N 19/176* (2014.01)
*H04N 19/186* (2014.01)
*H04N 19/86* (2014.01)
*H04N 19/14* (2014.01)
*H04N 19/182* (2014.01)
*H04N 19/157* (2014.01)
*H04N 19/159* (2014.01)

(52) U.S. Cl.
CPC ......... *H04N 19/157* (2014.11); *H04N 19/176* (2014.11); *H04N 19/182* (2014.11); *H04N 19/186* (2014.11); *H04N 19/86* (2014.11); *H04N 19/159* (2014.11)

(58) Field of Classification Search
CPC ............ H04N 7/26; H04N 7/50; H04N 19/52; H04N 19/55; G06K 9/40; G06K 9/48
USPC .......................................... 375/240.1–240.29
See application file for complete search history.

(56) References Cited

U.S. PATENT DOCUMENTS

| | | | | |
|---|---|---|---|---|
| 2008/0123750 | A1* | 5/2008 | Bronstein | H04N 19/436 375/240.24 |
| 2011/0110603 | A1* | 5/2011 | Ikai | H04N 19/86 382/260 |
| 2011/0123121 | A1* | 5/2011 | Springer | H04N 19/176 382/199 |
| 2012/0213271 | A1* | 8/2012 | Chong | H04N 19/14 375/240.02 |
| 2013/0101024 | A1 | 4/2013 | Auwera et al. | |
| 2014/0003498 | A1* | 1/2014 | Sullivan | H04N 19/86 375/240.03 |
| 2014/0072043 | A1* | 3/2014 | Tourapis | H04N 19/136 375/240.15 |
| 2014/0219348 | A1* | 8/2014 | Kobayashi | H04N 19/615 375/240.12 |
| 2014/0233649 | A1* | 8/2014 | Cheng | H04N 19/82 375/240.16 |
| 2015/0350652 | A1* | 12/2015 | Nellore | H04N 19/186 375/240.02 |
| 2016/0219298 | A1* | 7/2016 | Li | H04N 19/593 |
| 2018/0338161 | A1* | 11/2018 | Zhai | H04N 19/82 |

FOREIGN PATENT DOCUMENTS

| | | | | |
|---|---|---|---|---|
| CN | 103931185 | A | 7/2014 | |
| CN | 105850121 | A | 8/2016 | |
| EP | 1933566 | A2 * | 6/2008 | ........... H04N 19/159 |
| WO | 2006/099321 | A1 | 9/2006 | |
| WO | 2012/154847 | A1 | 11/2012 | |
| WO | WO-2012154847 | A1 * | 11/2012 | ........... H04N 19/176 |
| WO | 2015070772 | A1 | 5/2015 | |
| WO | WO-2018066241 | A1 * | 4/2018 | ........... H04N 19/117 |

OTHER PUBLICATIONS

International Telecommunication Union (ITU-T); "Series H: Audiovisual and Multimedia Systems; Infrastructure of Audiovisual Services—Coding of Moving Video"; Telecommunication Standardization Sector of ITU; H.265; Apr. 2015; 634 pages. (Year: 2015).*
"Series H: Audiovisual and Multimedia Systems, Infrastructure of audiovisual services—Coding of moving video, High efficiency video coding," H.265, Apr. 2015, ITU-T Telecommunication Standardization Sector of ITU. (Year: 2015).*
Gary Sullivan et al., "Meeting Report of the 10th meeting of the Joint Video Experts Team (JVET)", San Diego, US, Apr. 10-20, 2018 (Year: 2018).*
"Series H: Audiovisual and Multimedia Systems, Infrastructure of audiovisual services—Coding of moving video, High efficiency video coding," H.265, Apr. 2013, 15 pages, ITU-T Telecommunication Standardization Sector of ITU (Year: 2013).*
Chen, J. et al.; "Algorithm Description of Join Exploration Test Model 3"; Joint Video Exploration Team (JVET) of ITU-T SG 16 WP 3 and ISO/IEC JTC: 1/SC 29/WG 11; JVET-C1001 v3; May 26-Jun. 1, 2016; 37 pages.
International Telecommunication Union (ITU-T); "Series H: Audiovisual and Multimedia Systems; Infrastructure of Audiovisual Services—Coding of Moving Video"; Telecommunication Standardization Sector of ITU; H.265; Apr. 2013; 14 pages.
International Telecommunication Union (ITU-T); "Series H: Audiovisual and Multimedia Systems; Infrastructure of Audiovisual Services—Coding of Moving Video"; Telecommunication Standardization Sector of ITU; H.265; Apr. 2015; 534 pages.
Norkin et al., "CE12:Ericsson's and MediaTek's deblocking filter", Joint Collaborative Team on Video Coding (JCT-VC) of ITU-T SG16 WP3 and ISO/IEC JTC1/SC29/WG11, JCTVC-F118, Jul. 14-22, 2011, pp. 1-6.
Munteanu et al. "Performing Deblocking in Video Coding Based on Spatial-Domain Motion-Compensated Temporal Filtering", ACIVS 2006, LNCS 4179, 2006, pp. 364-374.
Author Unknown, "Series H: Audiovisual and Multimedia Systems, Infrastructure of audiovisual services—Coding of moving video, High efficiency video coding," H.265, Apr. 2013, 15 pages, ITU-T Telecommunication Standardization Sector of ITU.
Chinese Intellectual Property Office, Office Action in Chinese Application No. 201780060283.0, dated Oct. 9, 2021 (11 pages).
Wan Shuai et al., "The Principle, Standard, and Implementation of the New Generation of High-Efficiency Video Coding H.265/HEVC," Electronic Industry Press, Dec. 31, 2014, pp. 196-198. (An attachment of the above CN Office Action).

\* cited by examiner

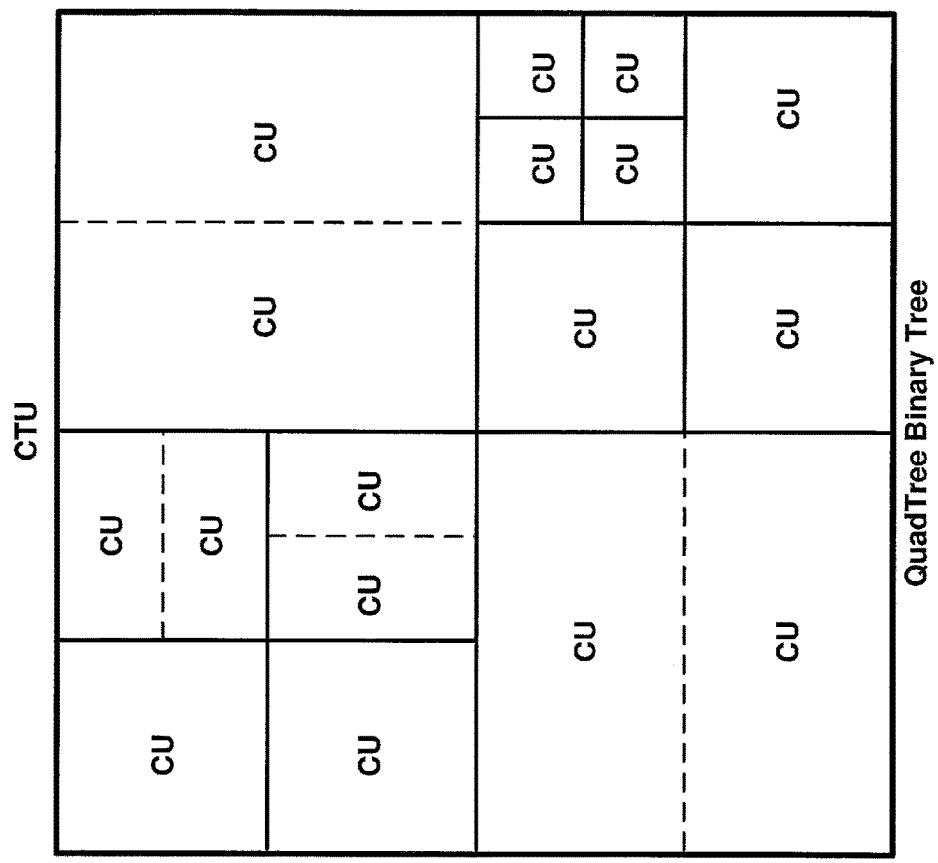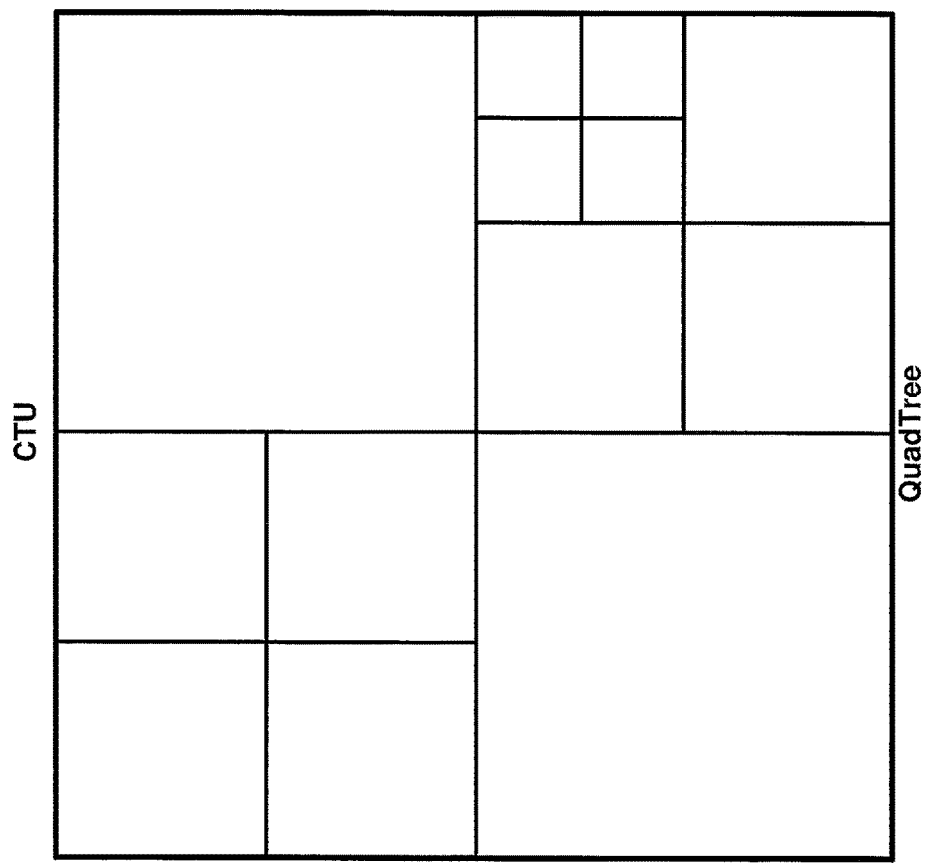
FIG. 2

FIG. 5A

|  P | Deblocking Boundary | Q |
|---|---|---|
| $p_{7,0}\ p_{6,0}\ p_{5,0}\ p_{4,0}\ p_{3,0}\ p_{2,0}\ p_{1,0}\ p_{0,0}$ | | $q_{0,0}\ q_{1,0}\ q_{2,0}\ q_{3,0}\ q_{4,0}\ q_{5,0}\ q_{6,0}\ q_{7,0}$ |
| $p_{7,1}\ p_{6,1}\ p_{5,1}\ p_{4,1}\ p_{3,1}\ p_{2,1}\ p_{1,1}\ p_{0,1}$ | | $q_{0,1}\ q_{1,1}\ q_{2,1}\ q_{3,1}\ q_{4,1}\ q_{5,1}\ q_{6,1}\ q_{7,1}$ |
| $p_{7,2}\ p_{6,2}\ p_{5,2}\ p_{4,2}\ p_{3,2}\ p_{2,2}\ p_{1,2}\ p_{0,2}$ | | $q_{0,2}\ q_{1,2}\ q_{2,2}\ q_{3,2}\ q_{4,2}\ q_{5,2}\ q_{6,2}\ q_{7,2}$ |
| $p_{7,3}\ p_{6,3}\ p_{5,3}\ p_{4,3}\ p_{3,3}\ p_{2,3}\ p_{1,3}\ p_{0,3}$ | | $q_{0,3}\ q_{1,3}\ q_{2,3}\ q_{3,3}\ q_{4,3}\ q_{5,3}\ q_{6,3}\ q_{7,3}$ |
| $p_{7,4}\ p_{6,4}\ p_{5,4}\ p_{4,4}\ p_{3,4}\ p_{2,4}\ p_{1,4}\ p_{0,4}$ | | $q_{0,4}\ q_{1,4}\ p_{2,4}\ q_{3,4}\ q_{4,4}\ q_{5,4}\ q_{6,0}\ q_{7,4}$ |
| $p_{7,5}\ p_{6,5}\ p_{5,5}\ p_{4,5}\ p_{3,5}\ p_{2,5}\ p_{1,5}\ p_{0,5}$ | | $q_{0,5}\ q_{1,5}\ q_{2,5}\ q_{3,5}\ q_{4,5}\ q_{5,5}\ q_{6,5}\ q_{7,5}$ |
| $p_{7,6}\ p_{6,6}\ p_{5,6}\ p_{4,6}\ p_{3,6}\ p_{2,6}\ p_{1,6}\ p_{0,6}$ | | $q_{0,6}\ q_{1,6}\ q_{2,6}\ q_{3,6}\ q_{4,6}\ q_{5,6}\ q_{6,6}\ q_{7,6}$ |
| $p_{7,7}\ p_{6,7}\ p_{5,7}\ p_{4,7}\ p_{3,7}\ p_{2,7}\ p_{1,7}\ p_{0,7}$ | | $q_{0,7}\ q_{1,7}\ q_{2,7}\ q_{3,7}\ q_{4,7}\ q_{5,7}\ q_{6,7}\ q_{7,7}$ |

Deblocking Boundary

Q $q_{0,0}\ q_{1,0}\ q_{2,0}\ q_{3,0}\ q_{4,0}\ q_{5,0}\ q_{6,0}\ q_{7,0}$
$q_{0,1}\ q_{1,1}\ q_{2,1}\ q_{3,1}\ q_{4,1}\ q_{5,1}\ q_{6,1}\ q_{7,1}$
$q_{0,2}\ q_{1,2}\ q_{2,2}\ q_{3,2}\ q_{4,2}\ q_{5,2}\ q_{6,2}\ q_{7,2}$
$q_{0,3}\ q_{1,3}\ q_{2,3}\ q_{3,3}\ q_{4,3}\ q_{5,3}\ q_{6,3}\ q_{7,3}$
$q_{0,4}\ q_{1,4}\ p_{2,4}\ q_{3,4}\ q_{4,4}\ q_{5,4}\ q_{6,0}\ q_{7,4}$
$q_{0,5}\ q_{1,5}\ q_{2,5}\ q_{3,5}\ q_{4,5}\ q_{5,5}\ q_{6,5}\ q_{7,5}$
$q_{0,6}\ q_{1,6}\ q_{2,6}\ q_{3,6}\ q_{4,6}\ q_{5,6}\ q_{6,6}\ q_{7,6}$
$q_{0,7}\ q_{1,7}\ q_{2,7}\ q_{3,7}\ q_{4,7}\ q_{5,7}\ q_{6,7}\ q_{7,7}$

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 6 | 7 | 8 |
| tc | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| tc | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | | | |
| β | 38 | 40 | 42 | 44 | 46 | 48 | 50 | 52 | 54 | 56 | 58 | 60 | 62 | 64 | - | - | | | |
| tc | 5 | 5 | 6 | 6 | 7 | 8 | 9 | 10 | 11 | 13 | 14 | 16 | 18 | 20 | 22 | 24 | | | |

FIG. 7

SYSTEMS AND METHODS FOR APPLYING DEBLOCKING FILTERS TO RECONSTRUCTED VIDEO DATA

CROSS REFERENCE

This Nonprovisional application claims priority under 35 U.S.C. § 119 on provisional Application No. 62/403,658 on Oct. 3, 2016, the entire contents of which are hereby incorporated by reference.

TECHNICAL FIELD

This disclosure relates to video coding and more particularly to techniques for de-blocking reconstructed video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 April 2015, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET) are studying the potential need for standardization of future video coding technology with a compression capability that significantly exceeds that of the current HEVC standard. The Joint Exploration Model 3 (JEM 3), Algorithm Description of Joint Exploration Test Model 3 (JEM 3), ISO/IEC JTC1/SC29/WG11 Document: JVET-C1001v3, May 2016, Geneva, CH, which is incorporated by reference herein, describes the coding features that are under coordinated test model study by the JVET as potentially enhancing video coding technology beyond the capabilities of ITU-T H.265. It should be noted that the coding features of JEM 3 are implemented in JEM reference software maintained by the Fraunhofer research organization. Currently, the updated JEM reference software version 3 (JEM 3.0) is available. As used herein, the term JEM is used to collectively refer to algorithm descriptions of JEM 3 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In general, this disclosure describes various techniques for coding video data. In particular, this disclosure describes techniques for deblocking reconstructed video data. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

An aspect of the invention is a method of filtering reconstructed video data, the method comprising: receiving an array of sample values including adjacent reconstructed video blocks for a component of video data; determining whether one or more conditions associated with the adjacent reconstructed video blocks are satisfied; selecting a filter based on whether the one or more conditions are satisfied; and modifying sample values in the adjacent reconstructed video blocks based on the selected filter.

BRIEF DESCRIPTION OF DRAWINGS

FIG. 2 is a conceptual diagram illustrating a quad tree binary tree partitioning in accordance with one or more techniques of this disclosure.

FIG. 5A is a conceptual diagram illustrating blocks of video data including a deblocking boundary in accordance with one or more techniques of this disclosure.

FIG. 5B is a conceptual diagram illustrating blocks of video data including a deblocking boundary in accordance with one or more techniques of this disclosure.

FIG. 7 is an example of a table that may be used to determine deblocking parameters in accordance with one or more techniques of this disclosure.

DESCRIPTION OF EMBODIMENTS

Video content typically includes video sequences comprised of a series of frames. A series of frames may also be referred to as a group of pictures (GOP). Each video frame or picture may include a plurality of slices or tiles, where a slice or tile includes a plurality of video blocks. As used herein, the term video block may generally refer to an area of a picture, including one or more video components, or may more specifically refer to the largest array of pixel/sample values that may be predictively coded, sub-divisions thereof, and/or corresponding structures. Further, the term current video block may refer to an area of a picture being encoded or decoded. A video block may be defined as an array of pixel values (also referred to as samples) that may be predictively coded. Video blocks may be ordered according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. In ITU-T H.265, the CTBs of a CTU may be partitioned into Coding Blocks (CB) according to a corresponding quadtree block structure. According to ITU-T H.265, one luma CB together with two corresponding chroma CBs (e.g., Cr and Cb chroma components) and associated syntax elements are referred to as a coding unit (CU). In ITU-T H.265, a minimum allowed size of a CB may be signaled. In ITU-T H.265, the smallest minimum allowed size of a luma CB is 8×8 luma samples. A CU is associated with a prediction unit (PU) structure defining one or more prediction units (PU) for the CU, where a PU is associated with corresponding reference samples. That is, in ITU-T H.265, the decision to code a picture area using intra prediction or inter prediction is made at the CU level. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples.

Figure 3:
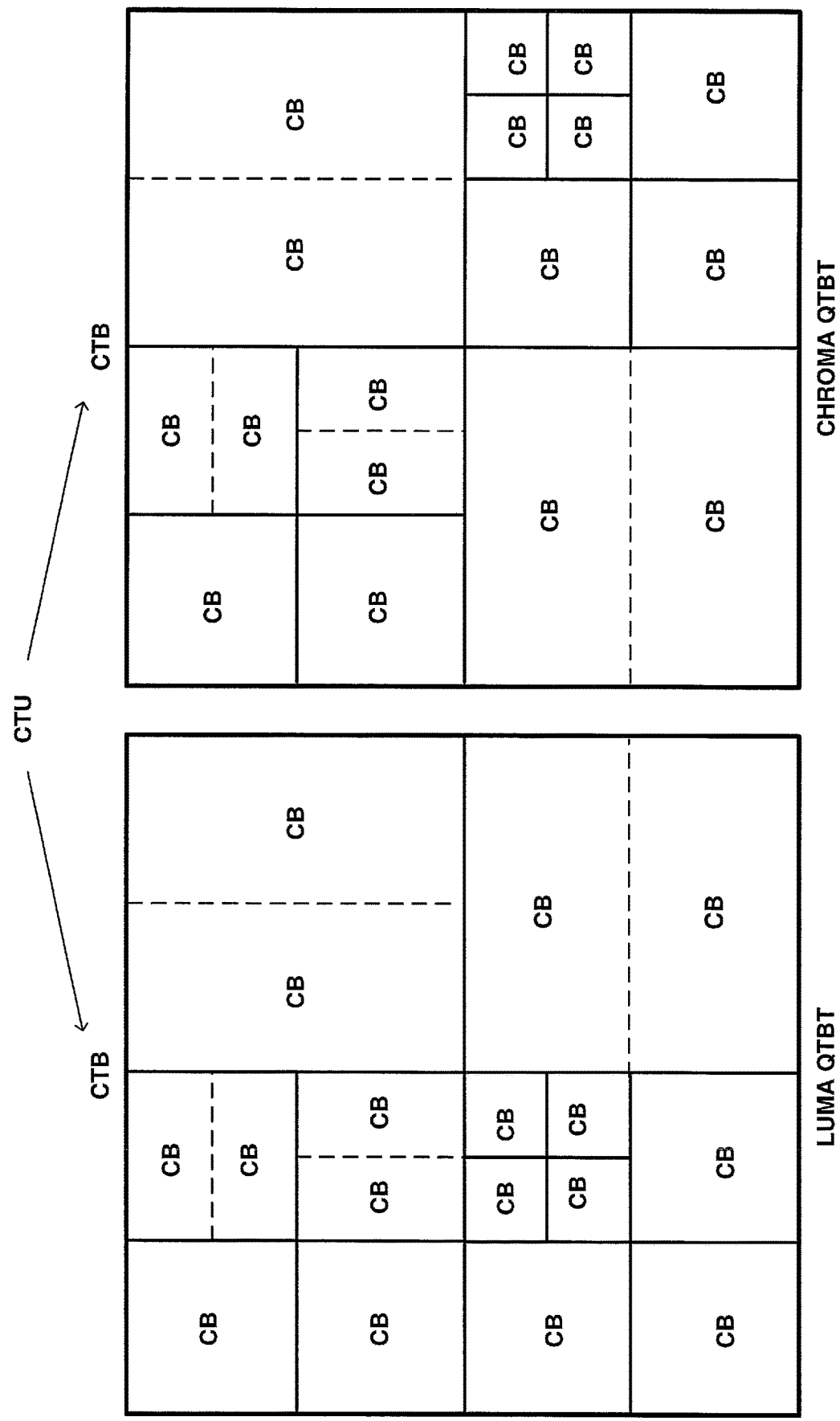
FIG. 3 is a conceptual diagram illustrating independent quad tree binary tree partitioning of video components in accordance with one or more techniques of this disclosure.

JEM specifies a CTU having a maximum size of 256×256 luma samples. In JEM, CTUs may be further partitioned according a quadtree plus binary tree (QTBT) block structure. In JEM, the QTBT structure enables quadtree leaf nodes to be further partitioned by a binary tree structure. In JEM, the binary tree structure enables quadtree leaf nodes to be divided vertically or horizontally. FIG. 2 illustrates an example of a CTU (e.g., a CTU having a size of 128×128 luma samples) being partitioned into quadtree leaf nodes and quadtree leaf nodes being further partitioned according to a binary tree. That is, in FIG. 2 dashed lines indicate binary tree partitions. Thus, the binary tree structure in JEM enables square and rectangular leaf nodes, where each leaf node includes a Coding Block (CB) for each component of video data. In JEM, CBs may be used for prediction without any further partitioning. Further, in JEM, luma and chroma components may have separate QTBT structures. That is, chroma CBs may be independent of luma partitioning. In JEM, separate QTBT structures are enabled for slices of video data coded using intra prediction techniques. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component do not necessarily align with CBs of chroma components.

It should be noted that JEM includes the following parameters for signaling of a QTBT tree:
  CTU size: the root node size of a quadtree (e.g., 256×256, 128×128, 64×64, 32×32, 16×16 luma samples);
  MinQTSize: the minimum allowed quadtree leaf node size (e.g., 16×16, 8×8 luma samples);
  MaxBTSize: the maximum allowed binary tree root node size, i.e., the maximum size of a leaf quadtree node that may be partitioned by binary splitting (e.g., 64×64 luma samples);
  MaxBTDepth: the maximum allowed binary tree depth, i.e., the lowest level at which binary splitting may occur (e.g., 3);
  MinBTSize: the minimum allowed binary tree leaf node size; i.e., the minimum width or height of a binary leaf node (e.g., 4 luma samples).

Figure 4:
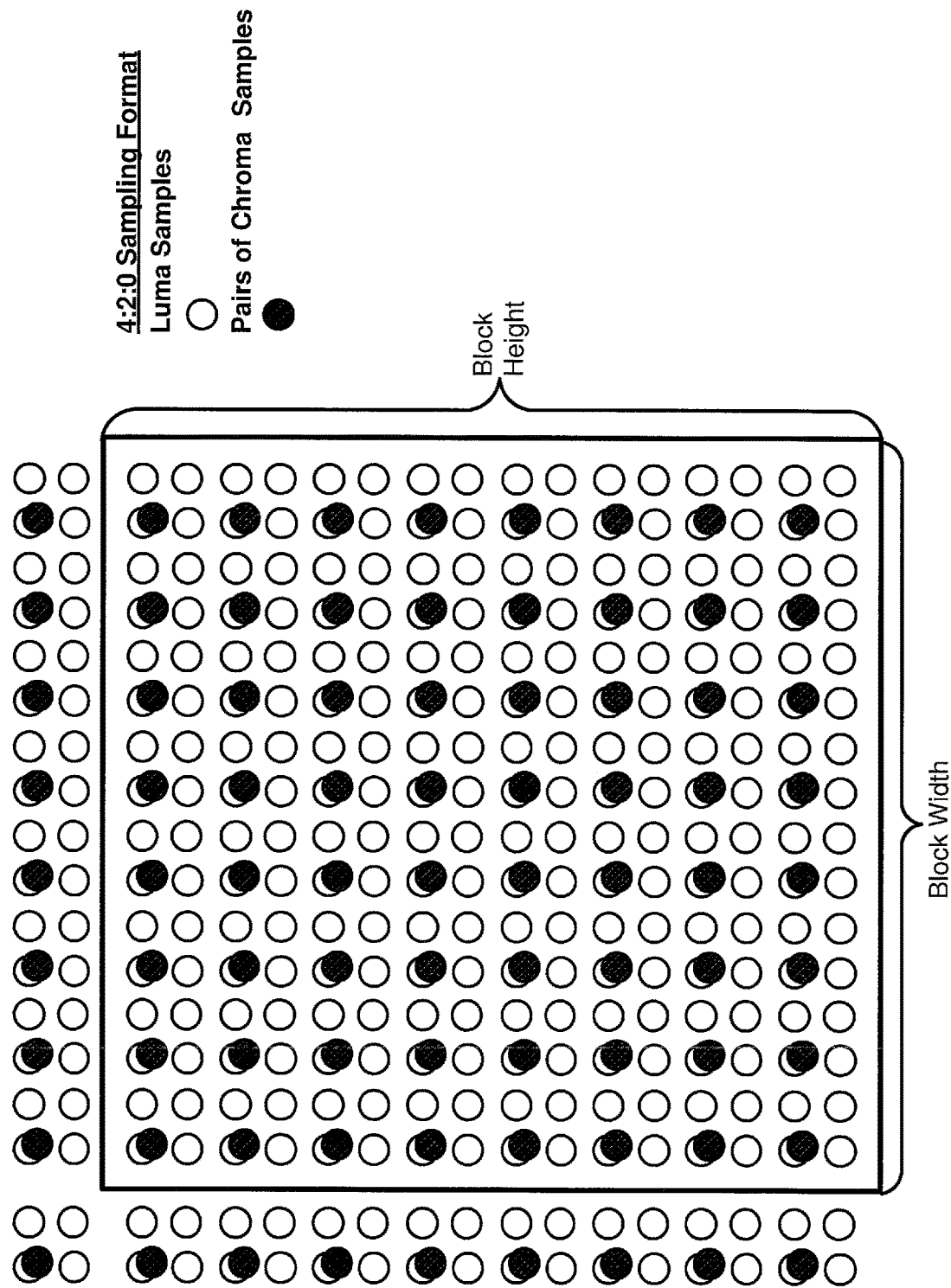
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in an example, the relative position of chroma samples with respect to luma samples for video blocks neighboring the 16×16 are illustrated in FIG. 4. Similarly, for a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

The difference between sample values included in a current CU, or another type of picture area structure, and associated reference samples (e.g., those generated using a prediction) may be referred to as residual data. Residual data may include respective arrays of difference values corresponding to each component of video data (e.g., luma (Y) and chroma (Cb and Cr). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, in ITU-T H.265, an array of pixel difference values may be sub-divided for purposes of generating transform coefficients (e.g., four 8×8 transforms may be applied to a 16×16 array of residual values), for each component of video data, such sub-divisions may be referred to as Transform Blocks (TBs). Currently in JEM, when a QTBT partitioning structure is used, residual values corresponding to a CB are used to generate transform coefficients without further partitioning. That is, in JEM a QTBT leaf node may be analogous to both a PB and TB in ITU-T H.265. Thus, JEM enables rectangular CB predictions for intra and inter predictions. Further, in JEM, a core transform and a subsequent secondary transforms may be applied (in the encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization scales transform coefficients in order to vary the amount of data required to send a group of transform coefficients. Quantization may include division of transform coefficients by a quantization scaling factor and any associated rounding functions (e.g., rounding to the nearest integer). Quantized transform coefficients may be referred to as coefficient level values or simply level values. Inverse quantization (or "dequantization") may include multiplication of coefficient level values by the quantization scaling factor. It should be noted that, as used herein, the term quantization process in some instances may refer to division by a quantization scaling factor to generate level values and multiplication by a quantization scaling factor to recover transform coefficients in some instances. That is, a quantization process may refer to quantization in some cases and inverse quantization in some cases. In ITU-T H.265, the value of a quantization scaling factor (referred to as $Q_{step}$ in ITU-T H.265) may be determined by a quantization parameter (QP). It should be noted that as used herein the term quantization parameter may be used to refer generally to a parameter used to determining values for quantization (e.g., quantization scaling factors) and/or may be used to more specifically refer to a specific implementation of a quantization parameter (e.g., $Qp'_Y$ in ITU-T H.265). In ITU-T H.265, the quantization parameter can take 52 values from 0 to 51 and a change of 1 for the quantization parameter generally corresponds to a change in the value of the $Q_{step}$ by approximately 12%.

Quantized transform coefficients and related data may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. After binarization, a CABAC entropy encoder may select a context model. For a particular bin, a context model may be selected from a set of available context models associated with the bin. In some examples, a context model may be selected based on a previous bin and/or values of previous syntax elements. For example, a context model may be selected based on the value of a neighboring intra prediction mode. A context model may identify the probability of a bin being a particular value. For instance, a context model may indicate a 0.7 probability of coding a 0-valued bin and a 0.3 probability of coding a 1-valued bin. After selecting an available context model, a CABAC entropy encoder may arithmetically code a bin based on the identified context model. It should be noted that some syntax elements may be entropy encoded using arithmetic encoding without the usage of an explicitly assigned context model, such coding may be referred to as bypass coding.

As described above, residual data may be encoded as an array of quantized transform coefficients. A reciprocal inverse quantization process and an inverse transformation may be applied to an array of quantized transform to generate reconstructed residual data. Reconstructed residual data may be added to a predictive video block to generate a reconstructed video block. The generation of a reconstructed video block may occur during a decoding process or during an encoding process. For example, during encoding, a resulting reconstructed video block may be used to evaluate the encoding quality for a given prediction, transformation type, and/or level of quantization. In some cases, coding video data on a block-by-block basis may result in so-called blocking artifacts. That is, in some cases, coding block boundaries of reconstructed video data may be visually perceptible to a user.

Figures 5A, 5B:
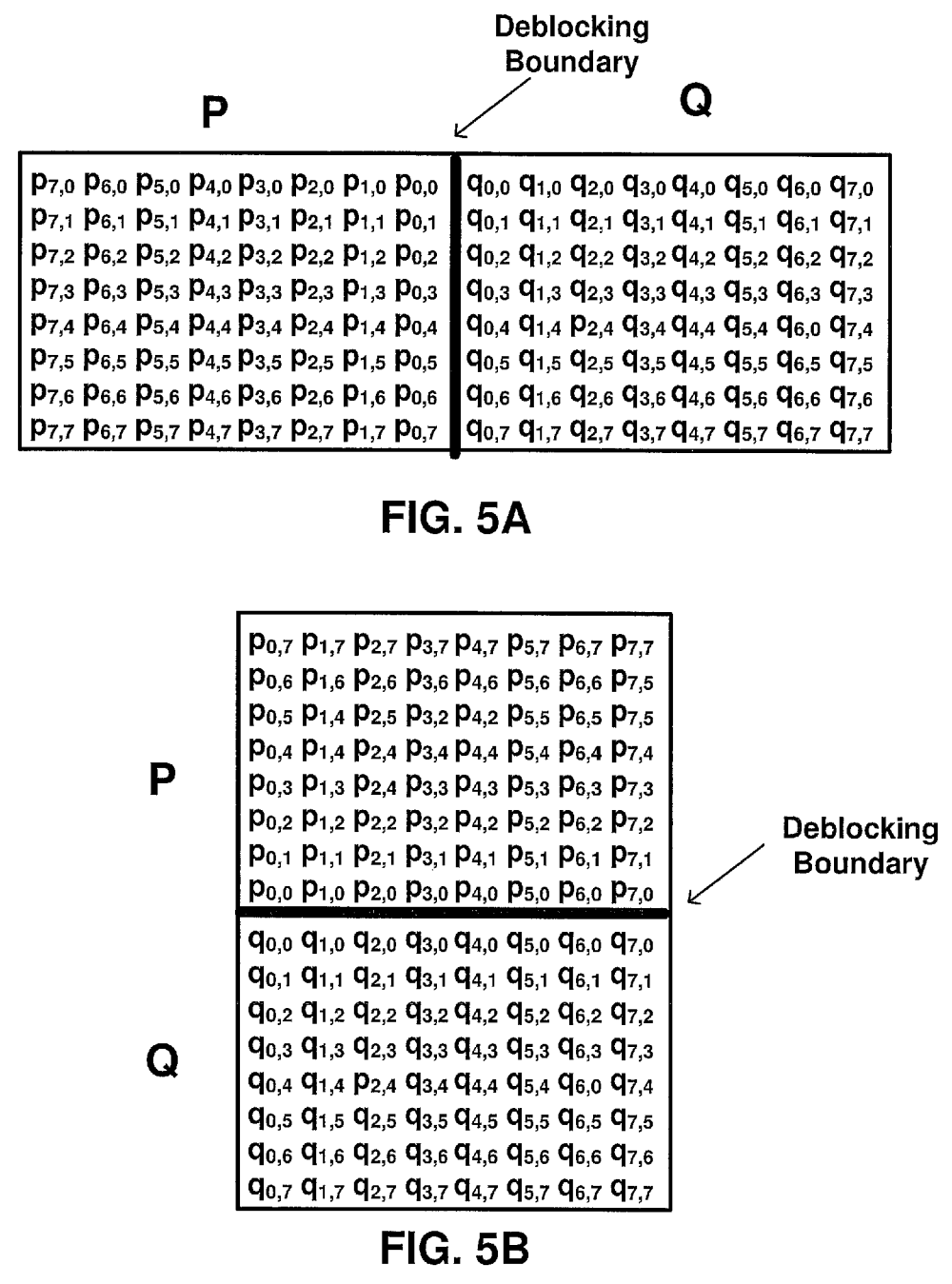

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. FIGS. 5A-5B illustrate sample values included in video blocks P and Q having a deblocking boundary. As used herein video blocks P and Q are used to refer to adjacent video blocks having a block boundary. The manner in which sample values are modified may be based on defined filters, where $p_i$ and $q_i$ represent respective sample values in a column for a vertical boundary and sample values in a row for a horizontal boundary and $p_i'$ and $q_i'$ represent modified sample values. ITU-T H.265 includes two types of filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Simplified definitions of the Strong Filter and Weak Filter equations for modifying luma sample values are provided below. The definitions are simplified in that they do not include clipping operations provided in ITU-T H.265, however, reference is made to Section 8.7.2.5.7 of ITU-T H.265, which provides the complete definitions.

Strong Filter $$p_0'=(p_2+2*p_1+2*p_0+2*q_0+q_1+4)/8$$

$$p_1'=(p_2+p_1+p_0+q_0+2)/4$$

$$p_2'=(2*p_3+3*p_2+p_1+p_0+q_0+4)/8$$

$$q_0'=(p_1+2*p_0+2*q_0+2*q_1+q_2+4)/8$$

$$q_1'=(p_0+q_0+q_1+q_2+2)/4$$

$$q_2'=(p_0+q_0+q_1+3*q_2+2*q_3+4)/8$$

Weak Filter $$\Delta=(9*(q_0-p_0)-3*(q_1-p_1)+8)/16$$

$$p_0'=p_0+\Delta$$

$$q_0'=q_0-\Delta$$

Where $p_i$ and $q_i$ are conditionally modified, as described below, as follows $$\Delta p=((p_2+p_0+1)/2-p_1+\Delta)/2$$

$$\Delta q=((q_2+p_0+1)/2-q_1-\Delta)/2$$

$$p_1'=p_1+\Delta p$$

$$q_1'=q_1+\Delta q$$

Further, ITU-T H.265 includes one type of filter that may be used for modifying chroma samples: Normal Filter. Simplified definitions for the Normal Filter equations for modifying chroma sample values are provided below.

Normal Filter $$\Delta=((q_0-p_0)*4+p_1-q_1+4)/8$$

$$p_0'=p_0+\Delta$$

$$q_0'=q_0-\Delta$$

Figure 6:
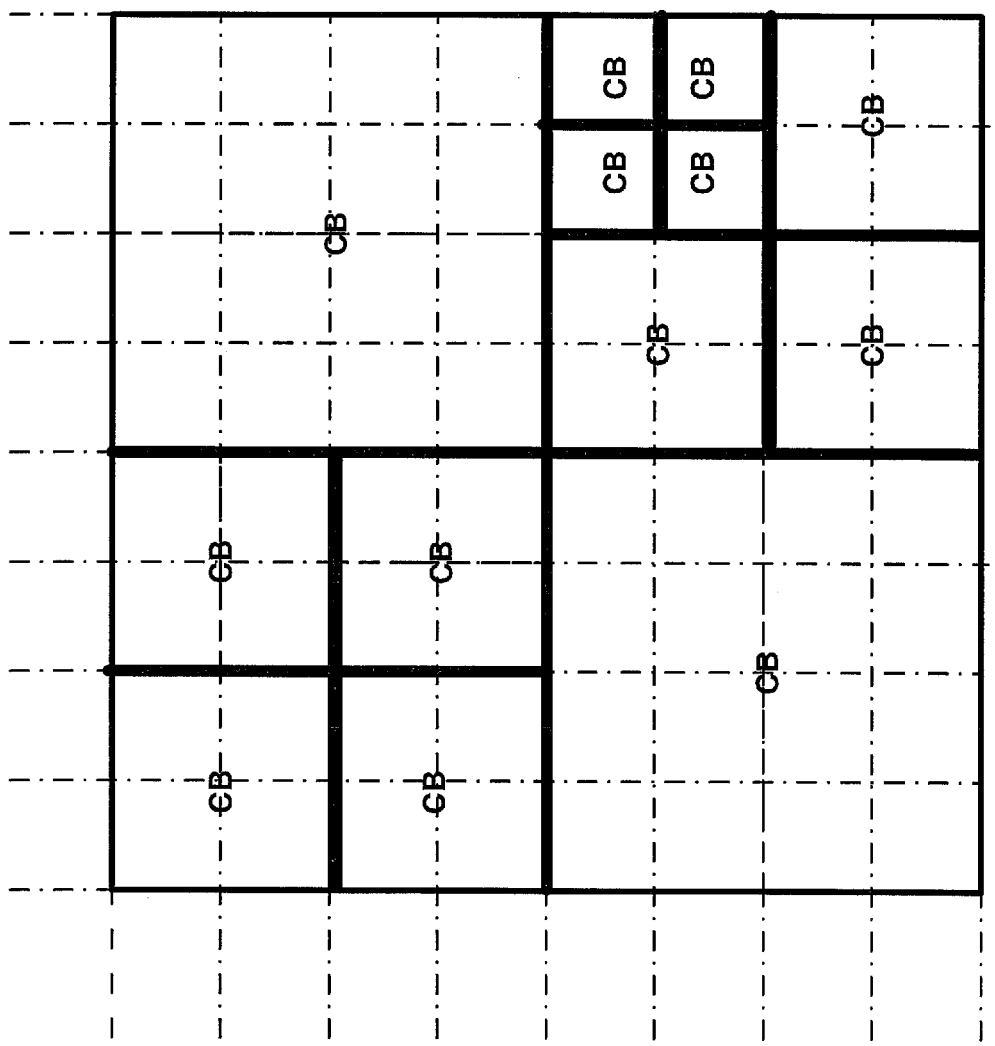
FIG. 6 is a conceptual diagram illustrating an example of a deblocking grid in accordance with one or more techniques of this disclosure.

Deblocking may be performed based on a deblocking granularity. ITU-T H.265 provides an 8×8 deblocking granularity. That is, in ITU-T H.265 for an area of a picture, each edge lying on the 8×8 grid is evaluated to determine if a boundary exists. FIG. 6 illustrates an example of boundary conditions that may exist, for example, for a luma CB in a 64×64 CU for an 8×8 deblocking grid. Further, in ITU-T H.265, a boundary strength (Bs) is determined for each boundary. In ITU-T H.265, Bs is determined as follows:

P and Q are two adjacent coding blocks then the filter strength Bs is specified as:
If one of the blocks (P or Q) has an intra prediction mode, then Bs=2;
Else if P and Q belong to different TBs and P or Q has at least one non-zero transform coefficient, then Bs=1;
Else if the reference pictures of P and Q are not equal, then Bs=1;
Else if P and Q has difference number of motion vectors, then Bs=1;
Else if the difference between x or y motion vector component of P and Q is equal or greater than one integer sample, then Bs=1;
Else, Bs=0.

In ITU-T H.265, based on the quantization parameters used for coding the CBs including video blocks P and Q (which may be referred to as $QP_P$ and $QP_Q$), variables $t_C$ and $\beta$ are determined. FIG. 7 provides a table for determining $t_C$ and $\beta$. In ITU-T H.265, Q is determined as follows:

For Luma:
Q=($QP_Q$+$QP_P$+1)/2+slice_beta_offset_div2*2, where slice_beta_offset_div2 is an offset value that applies to a slice of video data.
For Chroma:
Q=($QP_Q$+$QP_P$+1)/2+Chroma_QP_Offset+slice_beta_offset_div2*2, where Chroma_QP_Offset is a QP offset value that applies to a slice of video data.

Further, ITU-T H.265, defines a variable d, where d is determined based on luma sample values as follows:

$$dp0=\text{Abs}(p_{2,0}-2*p_{1,0}+p_{0,0})$$

$$dp3=\text{Abs}(p_{2,3}-2*p_{1,3}+p_{0,3})$$

$$dq0=\text{Abs}(q_{2,0}-2*q_{1,0}+q_{0,0})$$

$$dq3=\text{Abs}(q_{2,3}-2*q_{1,3}+q_{0,3})$$

$$dpq0=dp0+dq0$$

$$dpq3=dp3+dq3$$

$$dp=dp0+dp3$$

$$dq = dq0 + dq3$$

$$d = dpq0 + dpq3$$

where Abs(x) is the absolute value of x.

In ITU-T H.265, each of Bs, $t_C$, β, and d are used to determine which filter type to apply (e.g., Strong Filter or Weak Filter). In ITU-T H.265, for the luma component, if d is greater than or equal to β, filtering is not applied. In ITU-T H.265, for the luma component, if d is less than β, the Strong Filter is applied if the condition (dSam0=1 && dSam3=1) is satisfied, where && is a logical AND condition and where variables dSam0 and dSam3 are determined as follows:

If $((dpq0 \leq (\beta/4))$ && $((\text{Abs}(p_{3,0}-p_{0,0})+\text{Abs}(q_{0,0}-q_{3,0})) < (\beta/8))$ && $(\text{Abs}(p_{0,0}-q_{0,0}) < (5 * t_C+1)/2))$, then $d\text{Sam0}=1;$ Else $d\text{Sam0}=0.$ If $((dpq3 \leq (\beta/2))$ && $((\text{Abs}(p_{3,3}-p_{0,3})+\text{Abs}(q_{0,3}-q_{3,3})) < (\beta/8))$ && $(\text{Abs}(p_{0,3}-q_{0,3}) < 5 * t_C+1)/2))$, then $d\text{Sam3}=1;$ Else $d\text{Sam3}=0.$ Further, in ITU-T H.265, for the luma component, if d is less than β and the condition (dSam0=1 && dSam3=1) is not satisfied, the Weak Filter is applied, where the condition for modifying $p_1$ and $q_1$ is as follows:

If $dp < (\beta+(\beta/2))/8$, then $p_1' = p_1 + \Delta p$; and

If $dq < (\beta(\beta/2))/8$ then $q_1' = q_1 + \Delta q$.

In ITU-T H.265, for the chroma component, the Normal Filter is applied only when Bs equals 2. That is, in ITU-T H.265, deblocking only occurs for the chroma component if one the blocks P or Q is generated using an intra prediction mode. It should be noted that JEM implements the same basic deblocking configuration as provided in ITU-T H.265. Performing deblock as provided in ITU-T H.265 and JEM may be less than ideal. In some cases, deblocking the chroma components in the manner provided in ITU-T H.265 and JEM may be less than ideal.

Figure 1:
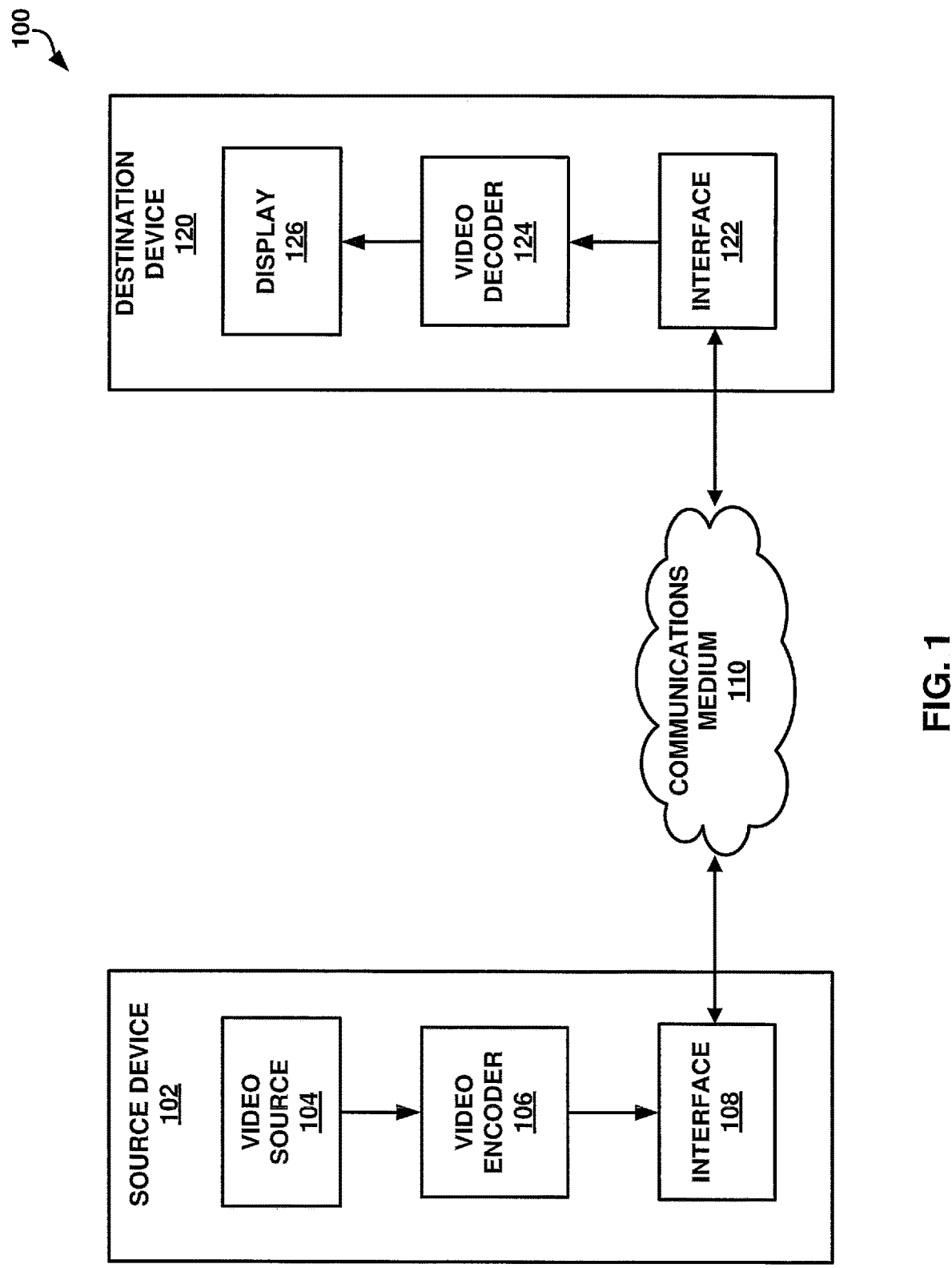
FIG. 1 is a block diagram illustrating an example of a system that may be configured to encode and decode video data according to one or more techniques of this disclosure.

FIG. 1 is a block diagram illustrating an example of a system that may be configured to code (i.e., encode and/or decode) video data according to one or more techniques of this disclosure. System 100 represents an example of a system that may deblock reconstructed video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 1, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream, video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 1, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
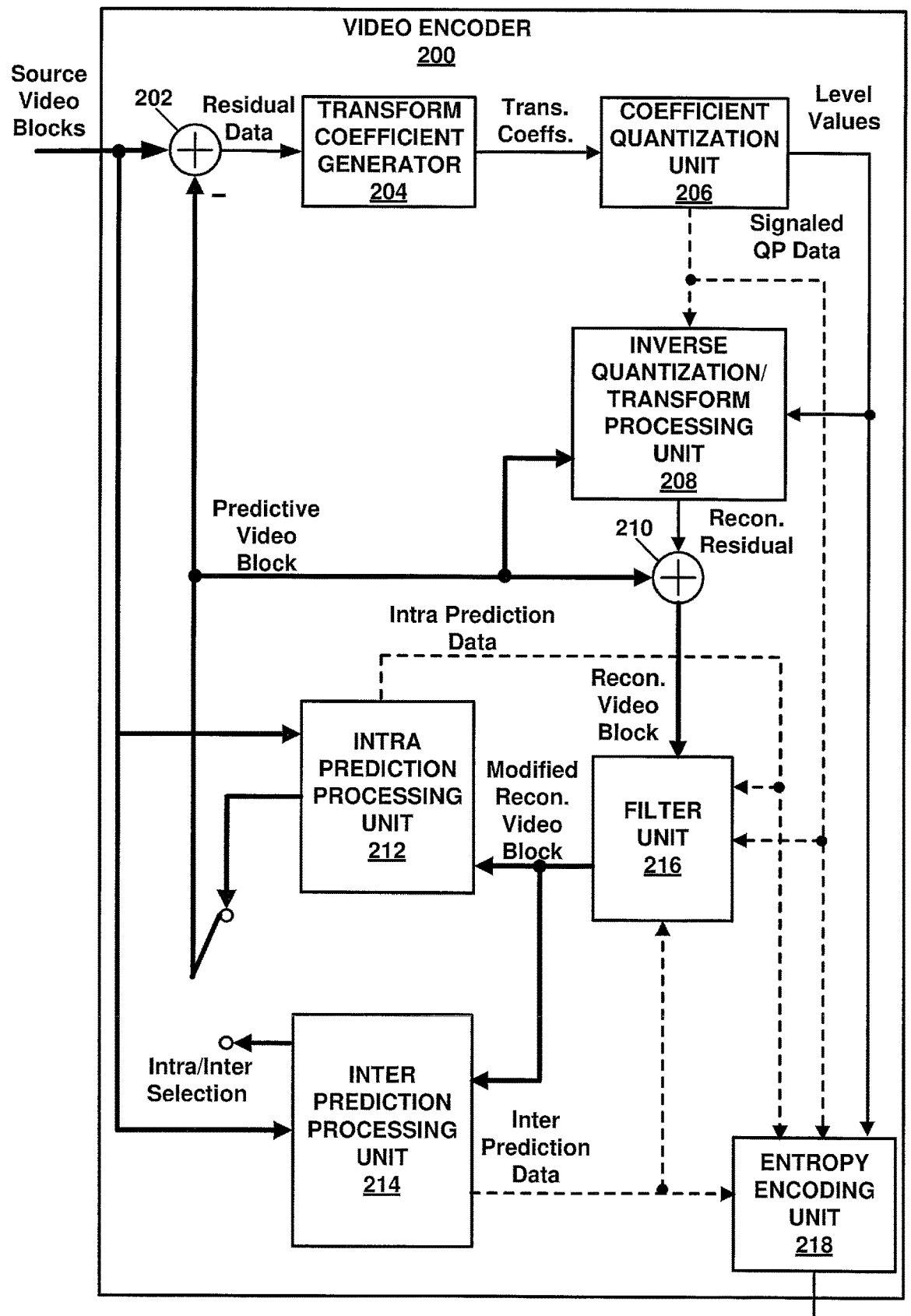
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder may be configured to perform additional sub-divisions of source video blocks. It should be noted that the techniques described herein are generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218. As illustrated in FIG. 8, video encoder 200 receives source video blocks and outputs a bitstream.

In the example illustrated in FIG. 8, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform co-efficient generator 204 may output transform coefficients to coefficient quantization unit 206.

Coefficient quantization unit 206 may be configured to perform quantization of the transform coefficients. As described above, the degree of quantization may be modified by adjusting a quantization scaling factor which may be determined by quantization parameters. Coefficient quantization unit 206 may be further configured to determine quantization values and output QP data that may be used by a video decoder to reconstruct a quantization parameter (and thus a quantization scaling factor) to perform inverse quantization during video decoding. For example, signaled QP data may include QP delta values. In ITU-T H.265, the degree of quantization applied to a set of transform coefficients may depend on slice level parameters, parameters inherited from a previous coding unit, and/or optionally signaled CU level delta values.

As illustrated in FIG. 8, quantized transform coefficients are output to inverse quantization/transform processing unit 208. Inverse quantization/transform processing unit 208 may be configured to apply an inverse quantization and/or an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given quality for a given prediction, transformation type, and/or level of quantization. Video encoder 200 may be configured to perform multiple coding passes (e.g., perform encoding while varying one or more coding parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to filter unit 216 and entropy encoding unit 218. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes. Further, in some examples, a prediction for a chroma component may be inferred from an intra prediction for a luma prediction mode.

Inter prediction processing unit 214 may be configured to perform inter prediction coding for a current video block. Inter prediction processing unit 214 may be configured to receive source video blocks and calculate a motion vector for PUs, or the like, of a video block. A motion vector may indicate the displacement of a PU, or the like, of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference.

Further, JEM supports advanced temporal motion vector prediction (ATMVP), spatial-temporal motion vector prediction (STMVP), and advanced motion vector resolution (AMVR) mode. Further, JEM supports overlapped block motion compensation (OBMC). Thus, JEM utilizes advanced inter prediction modes compared to ITU-T H.265. In JEM OBMC divides a CB into sub-blocks for purposes of determining motion vector information for each sub-block. That is, if a motion vector is provided for a CB, OBMC allows for additional motion vector information to be provided for specific sub-blocks with the CB. For example, a CB having 128×128 samples may be divided into 4×4 sub-blocks and sub-blocks located at the boundary of the CB may include additional motion vector information. In some examples, additional motion vector information may be inherited from neighboring sub-blocks located in another CB. For example, a predictive block for a sub-block may be generated as a weighted average of predictive blocks associated with neighboring sub-blocks. As used herein, OBMC may generally refer to inter prediction techniques where sub-blocks of a CB include more refined prediction information than provided for the CB or may more specifically refer to the OBMC technique described in JEM. It should be noted that JEM, uses the term motion compensated (MC) block as a structure corresponding to a CB in the description of OBMC. Further, in JEM, OBMC is performed for the sub-blocks forming the top and left boundary of a CB. Moreover, in JEM, OBMC may be applied for both luma and chroma components. In JEM, when a CU is coded with sub-CU mode (which may include sub-CU merge, affine, and frame rate up conversion (FRUC) mode), each sub-block of the CU is a MC block.

Inter prediction processing unit 214 may be configured to perform motion vector prediction according to one or more of the techniques described above. Inter prediction processing unit 214 may be configured to generate a predictive block using the motion prediction data. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to filter unit 216 and entropy encoding unit 218.

As described above, deblocking refers to the process of smoothing the boundaries of reconstructed video blocks. As illustrated in FIG. 8, filter unit 216 receives reconstructed video blocks and coding parameters and outputs modified reconstructed video data. Filter unit 216 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 8, intra prediction processing unit 212 and inter prediction processing unit 214 may receive modified reconstructed video block via filter unit 216. That is, in some cases, deblocking may occur in-loop, i.e., predictive video blocks stored in a reference buffer may be filtered. In some cases, deblocking may occur post-loop, i.e., after video data has been reconstructed and prior to being output to a display, for example. The techniques described herein are applicable in-loop deblocking, post-loop deblocking, and/or combinations thereof.

Figure 9:
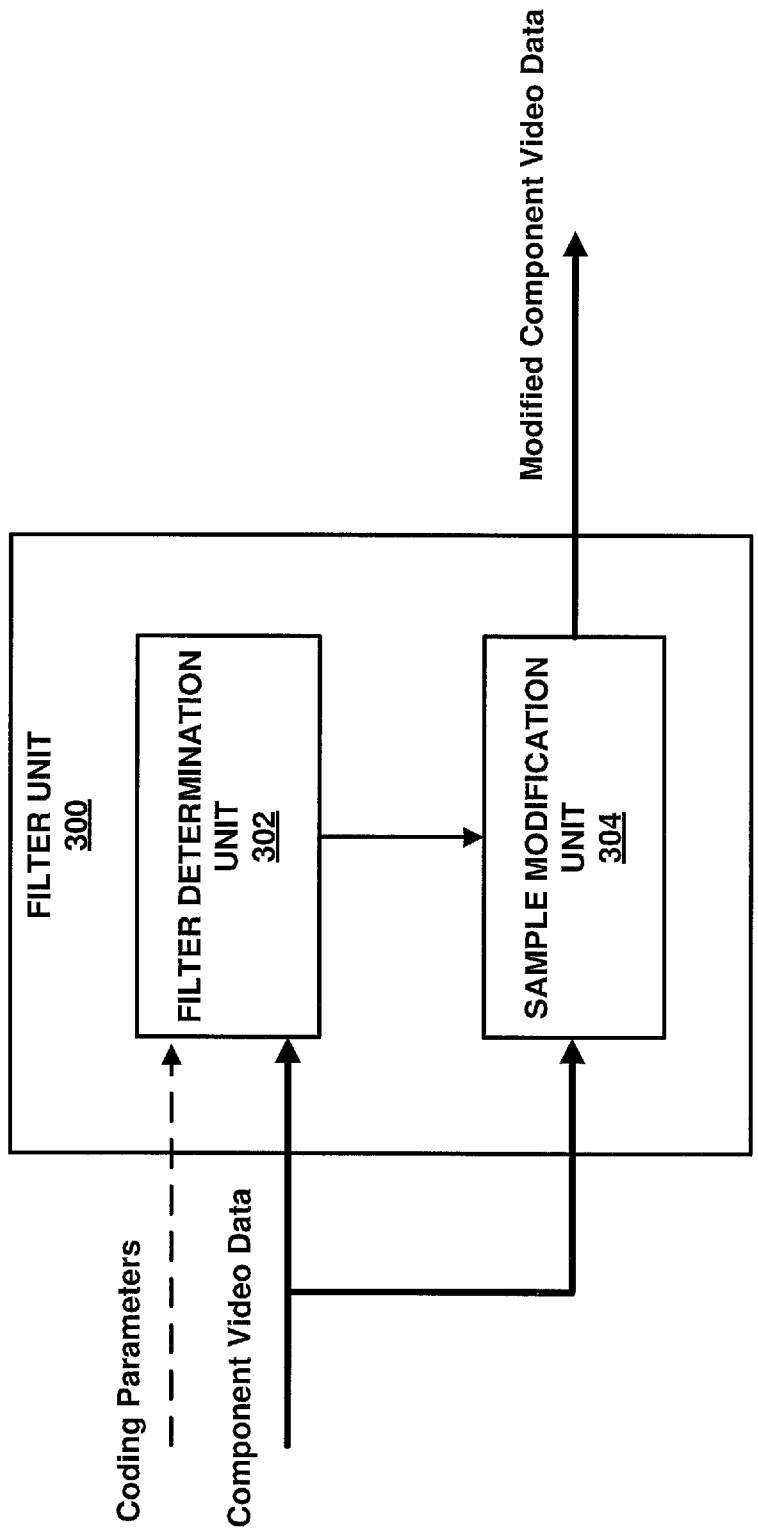
FIG. 9 is a block diagram illustrating an example of a filter unit that may be configured to filter reconstructed video data according to one or more techniques of this disclosure.

FIG. 9 is a block diagram illustrating an example of a filter unit that may be configured to filter reconstructed video data according to one or more techniques of this disclosure. As illustrated in FIG. 9, filter unit 300 includes filter determination unit 302 and sample modification unit 304. Filter determination unit 302 may be configured to receive coding parameters and component video data and determine a type of filter to apply to component video data. For example, filter determination unit 302 may be configured to determine one or more of Bs, $t_C$, $\beta$, and d based on sample values and coding parameters (e.g., QP values, prediction parameters, etc.), e.g., as described above. Filter determination unit 302 may output a determined filter type (e.g., Strong Filter) to sample modification unit 304. In some cases, a determined filter type may be a skip condition, e.g., deblocking does not occur for the boundary. Sample modification unit 304 may be configured to receive component video data (e.g., luma and/or chroma sample values) and a filter type and output modified video data. That is, sample modification unit 304 may include a memory storing equations corresponding to defined filter types (e.g., the Strong, Weak, and/or Normal filter equations provided above) and apply a respective set of equations to each component of received sample values.

Figure 10:
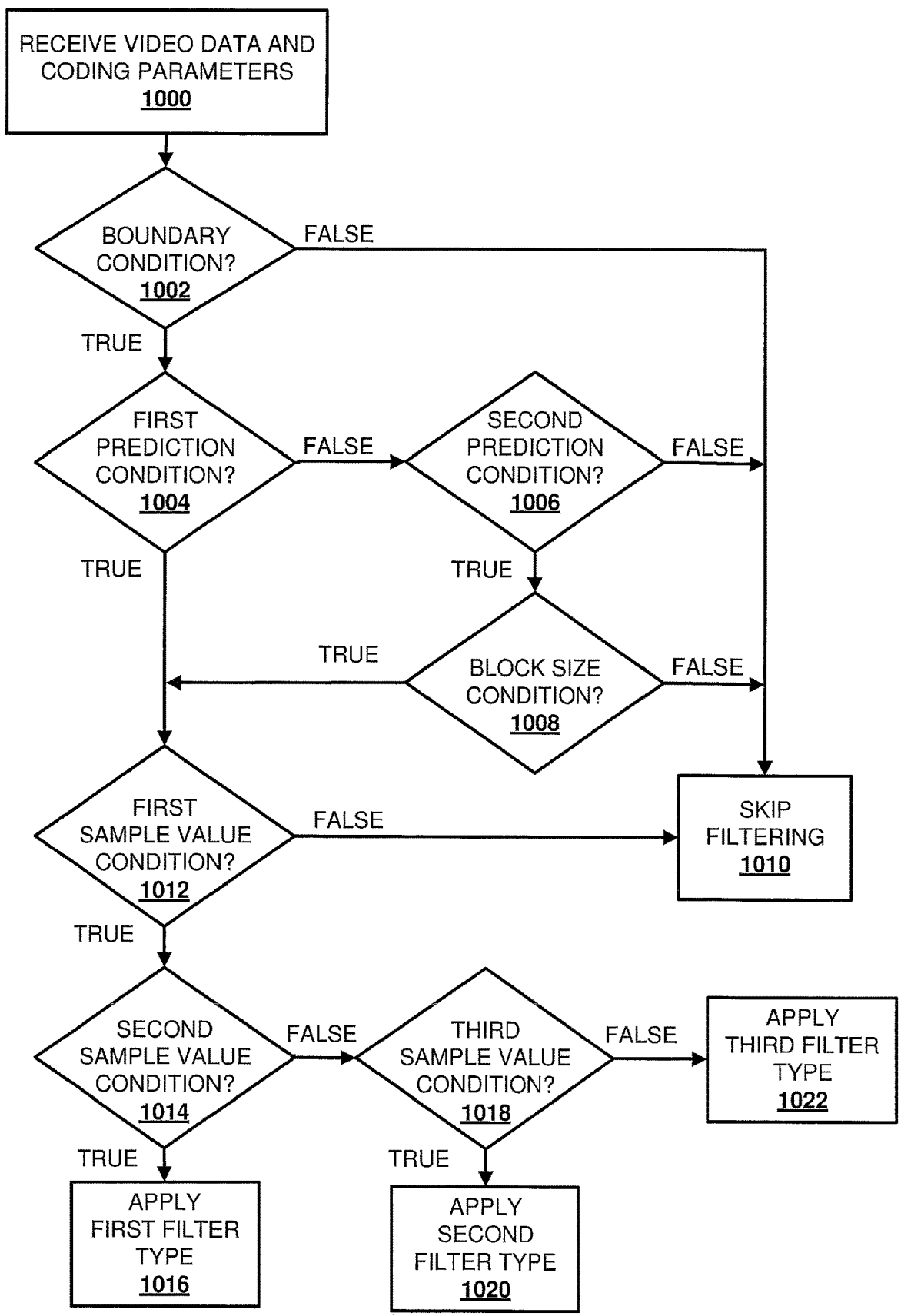
FIG. 10 is a flowchart illustrating an example of filtering video data according to one or more techniques of this disclosure.

As described above, in ITU-T H.265 and JEM, deblocking for the chroma components only occurs if Bs=2. In some instances it may be beneficial to apply de-blocking to chroma components in more cases. In one example, filter unit 300 may be configured to deblock chroma components and/or the luma components according to the techniques described herein. FIG. 10 is a flowchart illustrating an example of filtering video data according to one or more techniques of this disclosure. The examples of filtering video data described with respect to FIG. 10 may be applied to luma and/or chroma components of video data. It should be noted that although FIG. 10 is described with respect to filter unit 300 the techniques described may be realized in a system using any combination of hardware, firmware, and/or software implementations. Further, it should be noted that with respect to FIG. 10, and other flowcharts described herein, filter unit 300 may be configured to perform less than all of the illustrated decisions and resulting outcomes. For example, filter unit 300 may be configured to either perform filtering or skip filtering based on a block size condition.

Referring to FIG. 10, filter unit 300 receives video data and coding parameters (1000). In one example, filter unit 300 may receive reconstructed video blocks (e.g., sample values for one or more components of video) and associated coding parameters (e.g., flags defining a QTBT, prediction parameters, QP, etc.) for an area of a picture.

For regions within the area of a picture, filter unit 300 may determine if a boundary condition occurs (1002). That is, as described above, a deblocking granularity may be defined, a deblocking grid may be applied to the area of a picture, and CB boundaries on the deblocking grid may be identified as satisfying a boundary condition. It should be noted that in some cases, filter unit 300 may be configured apply an 8×8 deblocking grid for either luma or chroma samples, as described above, or apply a finer (e.g., 4×4) or a coarser (e.g., 16×16) deblocking grid. In one example, filter unit 300 may be configured to determine the granularity of a deblocking grid based on a CTU size. For example, for slices of video data having a CTU size greater than or equal to 128×128, the deblocking granularity may be 16×16 and for slices of video data having a CTU size less than 128×128, the deblocking granularity may be 16×16. As described above, when a boundary condition is satisfied, video blocks P and Q may be defined for subsequent deblocking operations.

At 1004, upon a boundary condition being satisfied, filter unit 300 may determine whether a first prediction condition is satisfied. In one example, the first prediction condition may be whether either of video blocks P or Q is included in a CB generated using an intra prediction mode. As described above, ITU-T H.265 provides that if one of blocks P or Q has an intra prediction mode, then a boundary strength variable, Bs, is set equal to 2. In some examples, the first prediction condition may correspond to Bs, or a similar boundary strength variable, being equal to 2.

As illustrated in FIG. 10, upon determining that a first prediction condition is not satisfied filter unit 300 may determine whether a second prediction condition is satisfied (1006). In one example, the second prediction condition may be whether any conditions in a set of conditions is satisfied. In one example, the set of conditions may include one or more of the conditions described above with respect to ITU-T H.265 causing Bs to be equal to 1. It should be noted, however, that in some examples, fewer, more, or a different set of the conditions may be used for the second prediction condition. For example, in one example, the second prediction condition may be satisfied only if the reference pictures used for P and Q are not equal. Further, in some examples, the second prediction condition may be satisfied only if particular types of inter prediction coding modes are used for the reconstruction of video blocks P or Q. Further, in some examples, one or more of the following additional conditions may be used for the second prediction condition: If inter prediction mode between P and Q is different, then condition satisfied.

If motion vector resolution between P and Q are different, then condition satisfied.

It should be noted that inter prediction modes may be different in any the following cases: both P and Q use merge mode, but different merge candidate lists are used. For example, if P uses a spatial merge candidate list and Q uses a temporal merge candidate list, if P uses a sub_block_mode merge candidate list (ATMVP and STMVP) and Q use other candidate lists; and one of P or Q uses a merge mode and the other uses a AMVP mode.

In one example, filter unit 300 may specify a Bs variable as described above and the first prediction condition in FIG. 10 may correspond to Bs being equal to 2 and the second prediction condition in FIG. 10 may correspond to Bs being equal to 1. In one example, Bs may be equal to 2, equal to 1, or equal to 0 based on the conditions described above with respect I-ITU H.265. Further, in one example, filter unit 300 may be configured to determine a boundary strength as follows:

P and Q are two adjacent coding blocks then the filter strength Bs is specified as:
If one of the blocks (P or Q) has an intra prediction mode, then Bs=2;
If one of the blocks (P or Q) is included in a CU using an OBMC, then Bs=0;
  Else if P and Q belong to different TBs and P or Q has at least one non-zero transform coefficient, then Bs=1;
  Else if the reference pictures of P and Q are not equal, then Bs=1;
  Else if P and Q has difference number of motion vectors, then Bs=1;
  Else if the difference between x or y motion vector component of P and Q is equal or greater than one integer sample, then Bs=1;
  Else if the quantization parameters between P and Q are not equal, then Bs=1;
  Else, Bs=0.

As described above, in JEM, OBMC may correspond to a case where a CB is coded using a sub-CB mode. Thus, in the example derivation of Bs above, if a sub-CB inter prediction coding mode, as provided in JEM, is used to generate either of video blocks P or Q, then deblocking may be skipped.

Figure 11C:
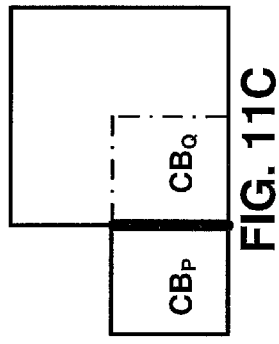
FIG. 11C is a conceptual diagram illustrating examples of sizes of coding blocks having a boundary condition in accordance with one or more techniques of this disclosure.
Figure 11F:
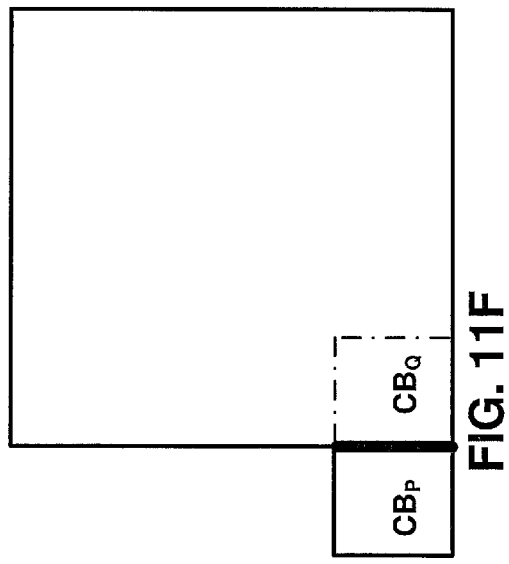
FIG. 11F is a conceptual diagram illustrating examples of sizes of coding blocks having a boundary condition in accordance with one or more techniques of this disclosure.
Figure 11B:
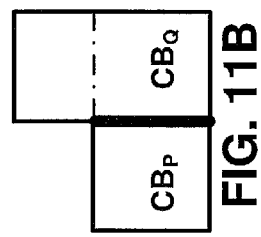
FIG. 11B is a conceptual diagram illustrating examples of sizes of coding blocks having a boundary condition in accordance with one or more techniques of this disclosure.
Figure 11E:
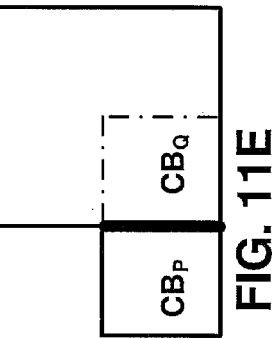
FIG. 11E is a conceptual diagram illustrating examples of sizes of coding blocks having a boundary condition in accordance with one or more techniques of this disclosure.
Figure 11A:
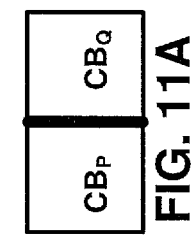
FIG. 11A is a conceptual diagram illustrating examples of sizes of coding blocks having a boundary condition in accordance with one or more techniques of this disclosure.
Figure 11D:
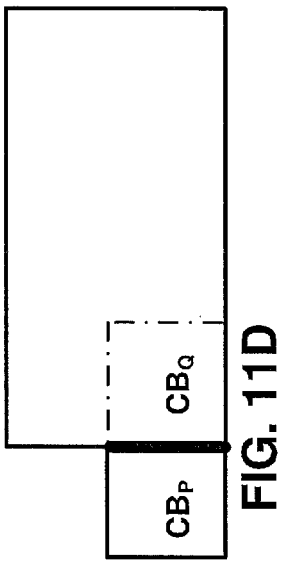
FIG. 11D is a conceptual diagram illustrating examples of sizes of coding blocks having a boundary condition in accordance with one or more techniques of this disclosure.

As illustrated in FIG. 10, upon determining that a second prediction condition is satisfied, filter unit 300 determines whether a block size condition is satisfied (1008). That is, filter unit 300 may determine whether a CB including video block P or Q satisfies a size condition. FIGS. 11A-11F are conceptual diagrams illustrating examples of sizes of coding blocks having a boundary condition in accordance with one or more techniques of this disclosure. In each of the examples illustrated in FIGS. 11A-11F, the CB including block P has the same size (e.g., 8×8) and the size of the CB including block Q varies. The examples illustrated in FIGS. 11A-11F illustrate various CB sizes and shapes that may be generated based on the QTBT structure described above with respect to JEM. For example, comparing FIG. 11C to FIG. 11D, although each of the CBs including Q in FIG. 11C and FIG. 11D have the same height (e.g., 16), the rectangle in FIG. 11D may cause a more perceptible blocking artifact. As such, it may be desirable to only apply deblocking in the case illustrated in FIG. 11D or, more generally, apply a stronger deblocking filter (e.g., modify sample values in more columns) in the case of FIG. 11D compared to the case of FIG. 11C.

In one example, a block condition may be whether one or both of block P and Q are included in a CB satisfying a minimum size condition. Minimum size conditions may be determined based on one or more of the following equations:

$$P_W>N1 \ \&\& \ P_H>N2;$$

$$Q_W>N3 \ \&\& \ Q_H>N4;$$

$$Max(P_W, P_H)>N5;$$

$$Max(Q_W, Q_H)>N6;$$

$$Max(P_W, P_H)>N7 \ \&\& \ Max(Q_W, Q_H)>N8;$$

$$Min(P_W, P_H)>N9;$$

$$Min(Q_W, Q_H)>N10;$$

$$Min(P_W P_H)>N11 \ \&\& \ Min(Q_W, Q_H)>N12;$$

$$P_W*P_H>N13;$$

$$Q_W*Q_H>N14;$$

$$P_W*P_H>N15 \ \&\& \ Q_W*Q_H>N16;$$

Where, $P_W$ is the width in samples of the CB including block P,
$P_H$ is the height in samples of the CB including block P,
$Q_W$ is the width in samples of the CB including block Q,
$Q_H$ is the height in samples of the CB including block Q,
Max(x,y) returns x, if x>y, else y,
Min(x,y) returns x, if x<y, else y, and
N1 to N16 are predefined threshold values (e.g., 8, 16, 32, 64, 128, 256, 512, 1024, etc.).

It should be noted that in some examples, any of N1 to N16 may be based on CTU size and/or other QTBT parameters described above. For example, greater CTU sizes may correspond to greater threshold values. For example, if the CTU size is 256×256, N13 may be equal to 1024 and if the CTU size is 128×128, N13 may be equal to 512. Further, it should be noted that in some examples, the values of N1 to N16 may be signalled, e.g., using a slice level parameter.

Referring again to FIG. 10, if any of: the boundary condition, the second prediction condition, or the block size condition are not satisfied, filter unit 300 skips deblocking (1010). As further illustrated in FIG. 10, upon determining that the first prediction condition is satisfied or the block size condition is satisfied, one of a first filter type, a second filter type, or a third filter type may be applied. As such, in the case where the techniques illustrated in FIG. 10 are applied to chroma components, deblocking may occur to chroma components when either of video block P or Q is included in a CB generated using an intra prediction mode and when either of video block P or Q are not included in a CB generated using an intra prediction mode in some cases, e.g., if when additional conditions are satisfied. Thus, filter unit 300 may be configured to apply de-blocking to chroma component video data in additional cases compared to the techniques described in ITU-T H.265 and JEM.

Referring again to FIG. 10, upon determining that the first prediction condition is satisfied or the block size condition is satisfied, filter unit 300 determines whether a first sample value condition (1012) is satisfied. If a first sample value condition is not satisfied, filter unit 300 skips deblocking (1010). As described above, in ITU-T H.265, the condition $d<\beta$, is used to determine whether deblocking is applied. That is, if d is greater than or equal to $\beta$, deblocking is not applied. In one example, the first sample condition, may include the condition $d<\beta$, where d and $\beta$ are determined as described above and if the condition $d<\beta$ is not satisfied deblocking is skipped. Further, in one example, filter unit 300 may be configured to determine d based on the following equations:

$$dp0=Abs(p_{2,0}-2*p_{1,0}+p_{0,0})$$

$$dp1=Abs(p_{2,1}-2*p_{1,1}+p_{0,1})$$

$$dq0=Abs(q_{2,0}-2*q_{1,0}+q_{0,0})$$

$$dq1=Abs(q_{2,1}-2*q_{1,1}+q_{0,1})$$

$$dpq0=dp0+dq0$$

$$dpq1=dp1+dq1$$

$$dp=dp0+dp1$$

$$dq=dq0+dq1$$

$$d=dpq0+dpq1$$

In this manner, filter unit 300 may determine d based on the two rows or column adjacent to the boundary. It should be noted that determining d in this manner may be useful for chroma deblocking. Thus, in one example, filter unit 300 may be configured to determine d for the luma component using the equations as described above with respect to ITU-T H.265 and determine d for the chroma components using a different set of equations. Further, it should be noted that in some cases, $\beta$ may be determined based on a table other than the table illustrated in FIG. 7. For example, there may be additional QP values that cause $\beta$ to be equal to 0, which would cause fewer cases to satisfy the $d<\beta$ condition. It should be noted that in the $d<\beta$ condition, d may be generalized as an estimated blockiness parameter determined based on sample values and $\beta$ may be generalized as a coding quality parameter. That is, a low value of d corresponds to a high estimated blockiness and a high value of $\beta$ corresponds to a low coding quality. In this manner, in the case of a relatively high estimated blockiness (e.g., d=0) and a relatively low coding quality (e.g., $\beta$=64), deblocking artifacts are likely to be present. Thus, the first sample value condition may correspond to a likeliness of blocking artifacts being present. In some examples a likeliness of blocking artifacts being present may be based on conditions other than $d<\beta$. In some examples, first sample value condition may simply determine whether the average of the quantization parameters of P and Q ($QP_P$ and $QP_Q$) is greater than a threshold. In some examples, d may be compared to a predetermined threshold or another parameter that provides an indication of coding quality.

Referring again to FIG. 10, upon determining that the first sample value condition is satisfied, filter unit 300 determines whether a second sample value condition is satisfied (1014) and if a second sample value condition is satisfied, a first filter type is applied (1016). In one example, the first filter type may include the Strong Filter described above. More generally, the first filter type may include a filter type causing the greatest number of sample values to be modified compared to other filter types applied by filter unit 300. For example, the first filter type may cause 3 (or 4) columns adjacent to the boundary to be modified and other filter types may cause fewer columns adjacent to the boundary to be modified. In one example, the first filter type may be defined based on the following equations:
Strong Filter 2

$$c_i = A_i * t_c + B_i,$$

where $A_i$ and $B_i$ are predetermined values. In some examples, the value of $A_i$ and/or $B_i$ may be based on the position of a sample. Further, it should be noted that in some examples, the equations used to derive $c_i$ may be position dependent. For example, although $c_i$ is shown as a linear function, in some examples, a different function may be used for some sample values (e.g., i>1). It should be noted that $c_i$ may be referred to as a clipping threshold.

where $t_C$, in some examples, may be determined as described above, or in some examples $t_C$ may be a different function of $QP_P$ and $QP_Q$.

$$p_0' = \text{Clip}(p_0 - c_0, p_0 + c_0, (o_0 + q_0)/2),$$

$$p_1' = \text{Clip}(p_1 - c_1, p_1 + c_1, (p_1 + q_1)/2);$$

$$p_2' = \text{Clip}(p_2 - c_2, p_2 + c_2, (p_2 + q_2)/2);$$

$$p_3' = \text{Clip}(p_3 - c_3, p_3 + c_3, (p_3 + q_3)/2);$$

$$q_0' = \text{Clip}(q_0 - c_0, q_0 + c_0, (p_0 + q_0)/2);$$

$$q_1' = \text{Clip}(q_1 - c_1, q_1 + c_1, (p_1 + q_1)/2);$$

$$q_2' = \text{Clip}(q_2 - c_2, q_2 + c_2, (p_2 + q_2)/2);$$

$$q_3' = \text{Clip}(q_3 - c_3, q_3 + c_3, (p_3 + q_2)/2);$$

where Clip (x, y, z), returns z, if x<z<y,
returns x, if z is less than or equal to x, or
returns y, if z is greater than or equal to y.

It should be noted that with respect to Strong Filter 2, functions other than $(p_i + q_i)/2$ may be used as the z in the Clip (x,y,z) function to determine $p_0'$ and/or $q_0'$. For example, a function, such as, for example, Abs $(2*p_i - q_i)$ may be used.

In the case where the first filter type corresponds to the Strong Filter described above or Strong Filter 2, in some cases, the second sample value condition may include the (dSam0=1 && dSam3=1) condition described above. In one example, the second sample value condition may be based on one or more of the following conditions:

Condition 1: $\text{Abs}(p_2 - 2*p_1 + p_0) + \text{Abs}(q_2 - 2*q_1 + q_0) < (\beta/8)$;

Condition 2: $\text{Abs}(p_3 - p_0) + \text{Abs}(q_3 - q_0) < (\beta/8)$; and

Condition 3: $\text{Abs}(p_0 - q_0) < (2.5 * t_C)$;

Where $\beta$ and $t_C$, in some examples, may be determined as described above, or in some examples $\beta$ may be a different function of $QP_P$ and $QP_Q$ and $t_C$ may be a different function of $QP_P$ and $QP_Q$.

In one example, the second sample value condition may be satisfied if:
Condition 1 && Condition 2 && Condition 3 && (P minimum size condition)

In one example, the second sample value condition may be satisfied if:
Condition 1 && Condition 2 && Condition 3 && (Q minimum size condition)

In one example, the second sample value condition may be satisfied if:

Condition 1 && Condition 2 && Condition 3 && ((P minimum size condition) OR (Q minimum size condition))

In one example, the second sample value condition may be satisfied if:
Condition 1 && Condition 2 && Condition 3 && ((P minimum size condition) && (Q minimum size condition))

It should be noted that minimum size conditions may include minimum size conditions described above (e.g., $P_W > N1$ && $P_H > N2$). In one example, the second sample value condition may be satisfied if:

Condition 1 && Condition 2 && Condition 3 && ($\text{Max}(P_W, Q_W) > N17$ && $\text{Max}(P_H, Q_H) > N18$;

Where N17 and N18 are predefined threshold values.

Referring again to FIG. 10, upon determining that the second sample value condition is not satisfied, filter unit 300 determines whether a third sample value condition is satisfied (1018). Based on whether the third sample value condition is satisfied, a second filter type is applied (1020) or a third filter type is satisfied (1022). In one example, the second filter type may include the Weak Filter described above where sample values in two adjacent rows or columns are modified. In one example, the third filter type may include the Weak Filter described above where sample values in one adjacent row or column are modified. In one example, the third filter type may include the Normal Filter described above.

In one example, the third sample value condition may be (Condition 4 && Condition 5), where Condition 4 and Condition 5 are defined as follows:

Condition 4: $\text{Abs}(p_{2,0} - 2*p_{1,0} + p_{0,0}) + \text{Abs}(p_{2,1} - 2*p_{1,1} + p_{0,1}) < 3*\beta/16$; and Condition 5: $\text{Abs}(q_{2,0} - 2*q_{1,0} + q_{0,0}) + \text{Abs}(q_{2,1} - 2*q_{1,1} + q_{0,1}) < 3*\beta/16$ where $\beta$, in some examples, may be determined as described above, or in some examples $\beta$ may be a different function of $QP_P$ and $QP_Q$.

In this manner, as illustrated in FIG. 10, filter unit 300 may be configured to conditionally skip deblocking or apply one of a first filter type, a second filter type or a third filter type to reconstructed video blocks for a component of video data. It should be noted that in some examples, filter unit 300 may be configured to deblock a chroma component as provided in I-ITU H.265 or deblock a chroma component according to the techniques described above with respect to FIG. 10. In one example, a flag may be signaled at one of a slice level, a sequence parameter set (SPS) level, or a picture parameter set (PPS) level to indicate (e.g., to a video decoder) how a chroma component is deblocked. For example, flag may indicate whether deblocking as provided in as provided in I-ITU H.265 is applied or deblocking according to the techniques described above with respect to FIG. 10 is applied.

Figure 12:
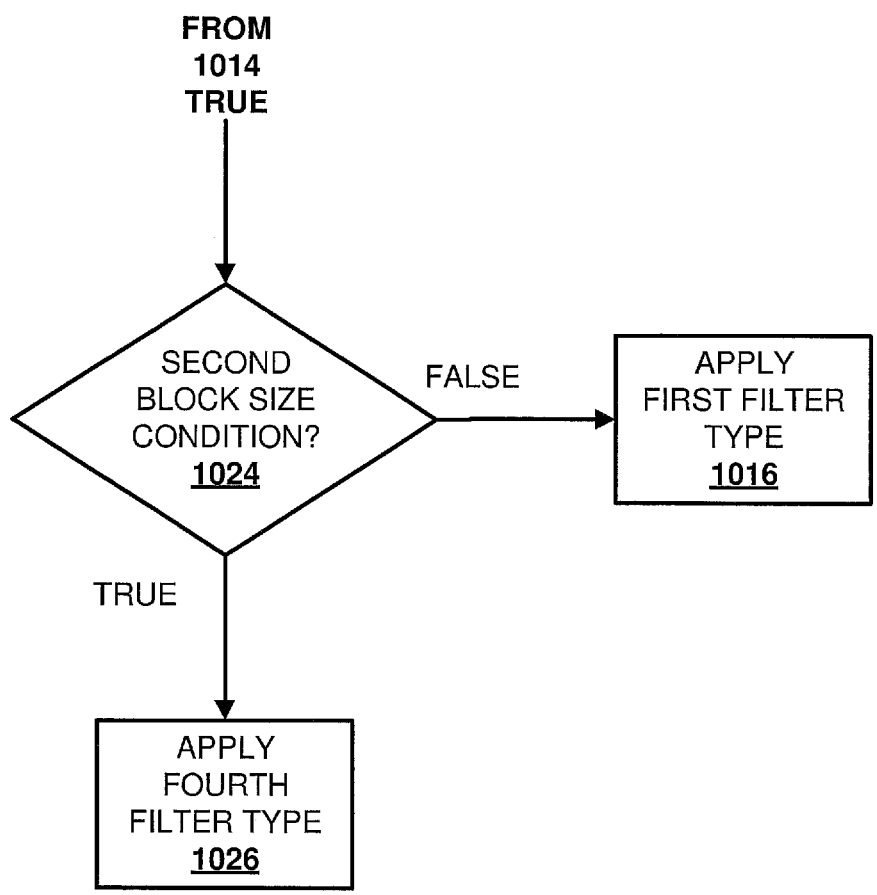
FIG. 12 is a flowchart illustrating an example of filtering video data according to one or more techniques of this disclosure.
Figure 13:
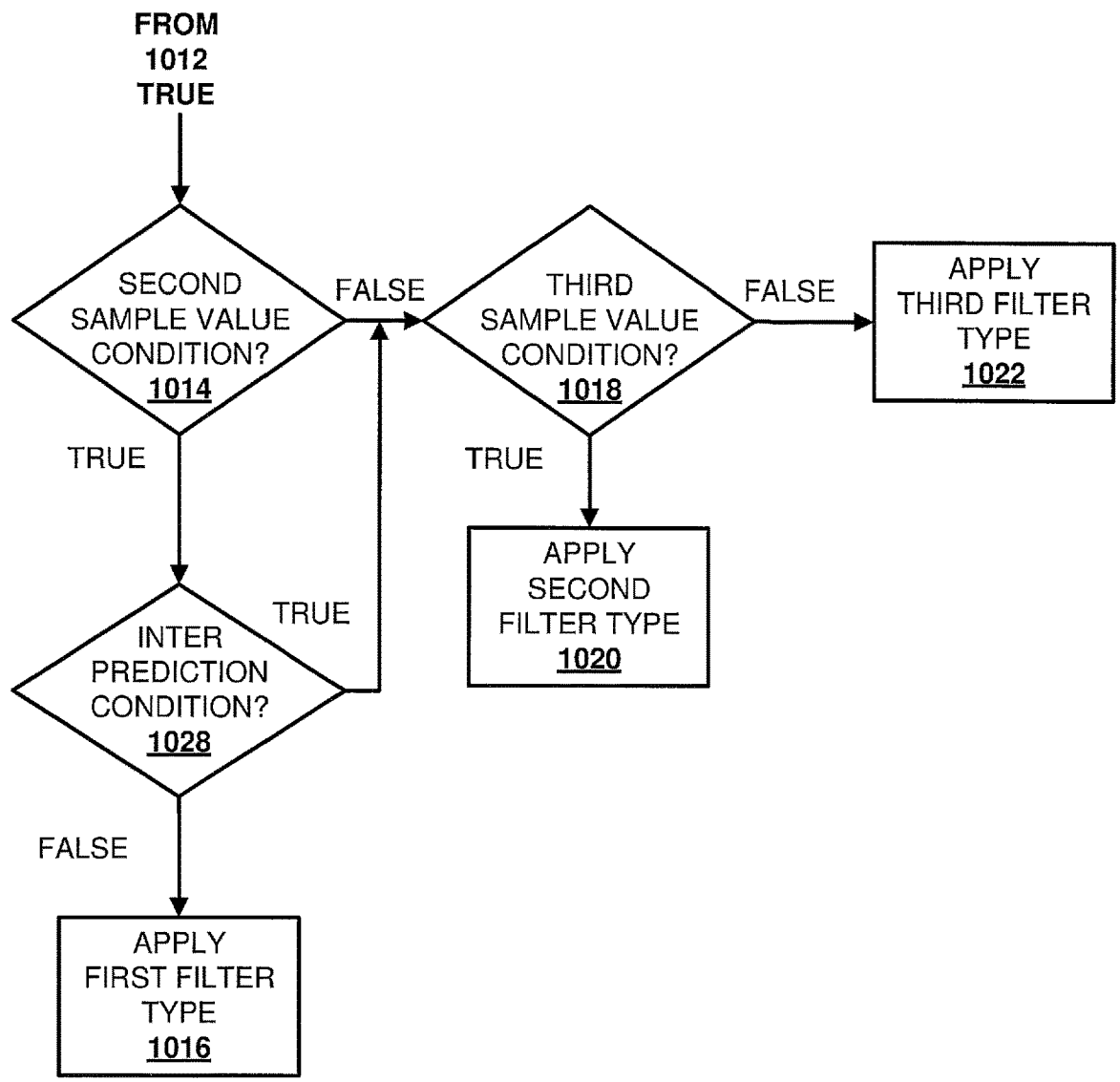
FIG. 13 is a flowchart illustrating an example of filtering video data according to one or more techniques of this disclosure.

Further, in some examples, additional conditions may be included in the technique illustrated in FIG. 10. FIG. 12 is a flowchart illustrating an example of filtering video data where a fourth filter type may be used for deblocking (1026). In one example, the fourth filter type may include the Strong Filter 2 described above and the first filter type may include the Strong Filter described above. In one example, the second block size condition (1024) may include any of the minimum size conditions for video block P and/or Q described above. FIG. 13 is a flowchart illustrating an example of filtering video data where an additional condition is consider to determine if a first filter type is used for deblocking. As illustrated in FIG. 13, an inter prediction condition is evaluated at 1028 to determine whether the first filter type is applied. As described above, JEM supports advanced (compared to I-ITU H.265) inter prediction modes, such as, for example, OBMC. In some cases, it may be desirable to only apply de-blocking in the case where an advanced inter prediction mode is not used, or more generally, apply a weaker deblocking filter (e.g., modify sample values in fewer columns or rows) in the case where an advanced inter prediction mode is used. For example, as described above, in JEM, OBMC is performed for the sub-blocks forming the top and left boundary of a CB. Performing OBMC in this manner may result in a reduction of blocking artifacts and as such, in this case, it may be desirable to apply a weaker deblocking filter than would be applied in the case where OBMC is not performed. The inter prediction condition in FIG. 13 may correspond to the use of an advanced inter prediction mode. For example, one or more of sub-CB motion vector prediction, adaptive motion vector difference resolution, OBMC, local illumination compensation, affine motion compensation prediction, pattern matched motion vector derivation, or bi-directional optical flow, as described in JEM 3.0. Further, it should be noted that in some examples, the inter prediction condition may be different for a luma component and chroma components. Further, in some examples, the inter prediction condition may signaled at a slice level, a SPS level, or a PPS level.

Referring again to FIG. 8, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. As described above, flags may be used to indicate if and/or how deblocking is performed. Values of these flags may be signaled in the bitstream. Further, one or more values used by a video decoder to determine a deblocking parameters may be included in the bitstream.

Figure 14:
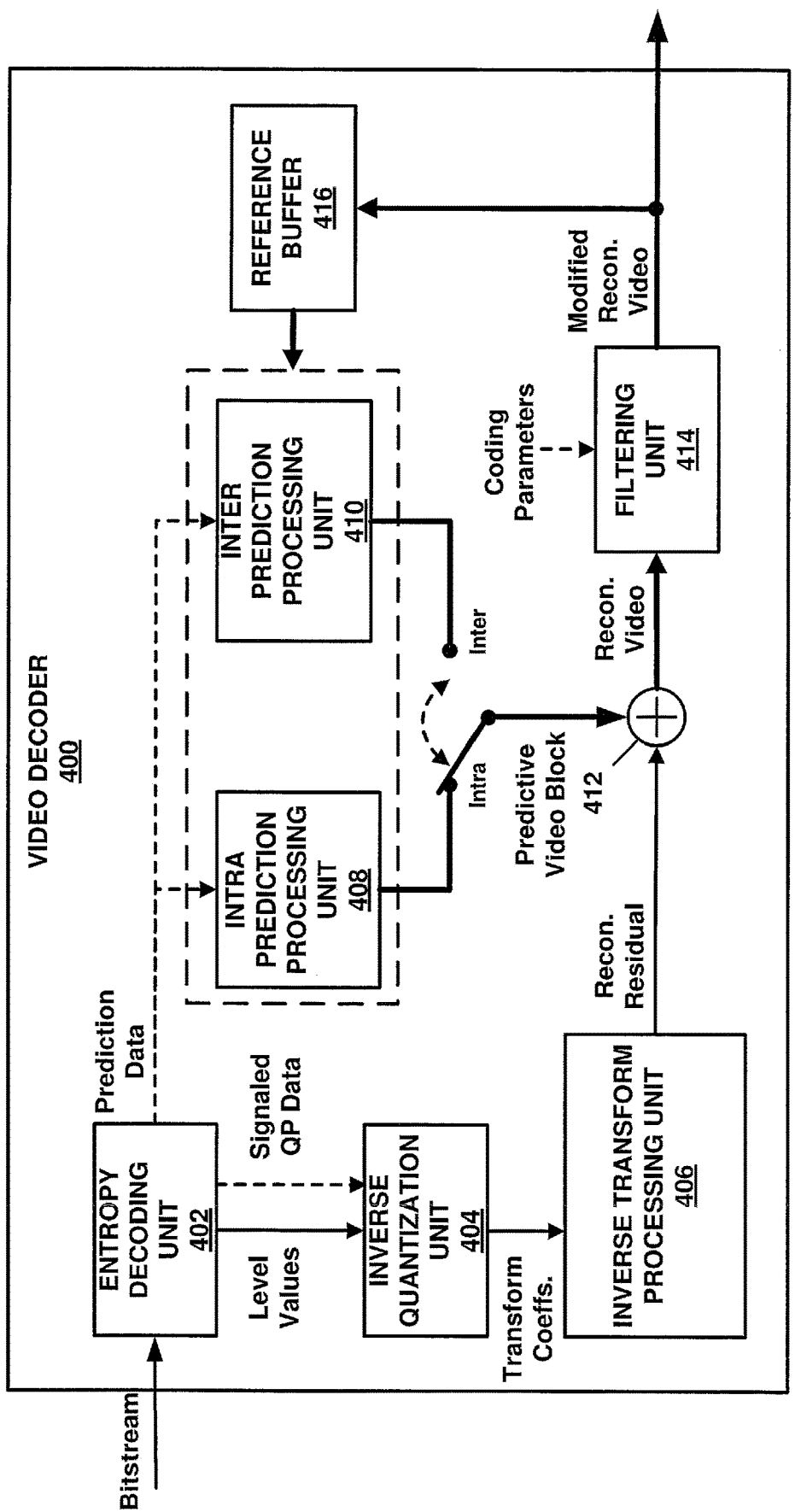
FIG. 14 is a block diagram illustrating an example of a video decoder that may be configured to decode video data according to one or more techniques of this disclosure.

FIG. 14 is a block diagram illustrating an example of a video decoder that may be configured to decode video data according to one or more techniques of this disclosure. In one example, video decoder 400 may be configured to perform deblocking of reconstructed video data based on one or more of the techniques described above. Video decoder 400 may be configured to perform intra prediction decoding and inter prediction decoding and, as such, may be referred to as a hybrid decoder. In the example illustrated in FIG. 14 video decoder 400 includes an entropy decoding unit 402, inverse quantization unit 404, inverse transform processing unit 406, intra prediction processing unit 408, inter prediction processing unit 410, summer 412, filter unit 414, reference buffer 416, and scaling unit 418. Video decoder 400 may be configured to decode video data in a manner consistent with a video encoding system, which may implement one or more aspects of a video coding standard. It should be noted that although example video decoder 400 is illustrated as having distinct functional blocks, such an illustration is for descriptive purposes and does not limit video decoder 400 and/or sub-components thereof to a particular hardware or software architecture. Functions of video decoder 400 may be realized using any combination of hardware, firmware, and/or software implementations.

As illustrated in FIG. 14, entropy decoding unit 402 receives an entropy encoded bitstream. Entropy decoding unit 402 may be configured to decode syntax elements and quantized coefficients from the bitstream according to a process reciprocal to an entropy encoding process. Entropy decoding unit 402 may be configured to perform entropy decoding according any of the entropy coding techniques described above. Entropy decoding unit 402 may parse an encoded bitstream in a manner consistent with a video coding standard.

Referring again to FIG. 14, inverse quantization unit 404 receives quantized transform coefficients (i.e., level values) and quantization parameter data from entropy decoding unit 402. Quantization parameter data may include any and all combinations of delta QP values and/or quantization group size values and the like described above. Video decoder 400 and/or inverse quantization unit 404 may be configured to determine quantization values used for inverse quantization based on values signaled by a video encoder and/or through video properties and/or coding parameters. That is, inverse quantization unit 404 may operate in a reciprocal manner to coefficient quantization unit 206 described above. Inverse quantization unit 404 may be configured to apply an inverse quantization. Inverse transform processing unit 406 may be configured to perform an inverse transformation to generate reconstructed residual data. The techniques respectively performed by inverse quantization unit 404 and inverse transform processing unit 406 may be similar to techniques performed by inverse quantization/transform processing unit 208 described above. Inverse transform processing unit 406 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether particular transform (or type of particular transform) is performed may be dependent on an intra prediction mode. As illustrated in FIG. 14, reconstructed residual data may be provided to summer 412. Summer 412 may add reconstructed residual data to a predictive video block and generate reconstructed video data. A predictive video block may be determined according to a predictive video technique (i.e., intra prediction and inter frame prediction).

Intra prediction processing unit 408 may be configured to receive intra prediction syntax elements and retrieve a predictive video block from reference buffer 416. Reference buffer 416 may include a memory device configured to store one or more frames of video data. Intra prediction syntax elements may identify an intra prediction mode, such as the intra prediction modes described above. In one example, intra prediction processing unit 408 may reconstruct a video block using according to one or more of the intra prediction coding techniques describe herein. Inter prediction processing unit 410 may receive inter prediction syntax elements and generate motion vectors to identify a prediction block in one or more reference frames stored in reference buffer 416. Inter prediction processing unit 410 may produce motion compensated blocks, possibly performing interpolation based on interpolation filters. Identifiers for interpolation filters to be used for motion estimation with sub-pixel precision may be included in the syntax elements. Inter prediction processing unit 410 may use interpolation filters to calculate interpolated values for sub-integer pixels of a reference block. Filter unit 414 may be configured to perform filtering on reconstructed video data according to the techniques described herein. For example, filter unit 414 may be configured to perform deblocking and/or SAO filtering, as described above with respect to filter unit 216 and filter unit 300. Further, it should be noted that in some examples, filter unit 414 may be configured to perform proprietary discretionary filter (e.g., visual enhancements). As illustrated in FIG. 4, a reconstructed video block may be output by video decoder 400.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<overview>

In one example, a method of filtering reconstructed video data comprises receiving an array of sample values including adjacent reconstructed video blocks for a component of video data, determining whether one or more conditions associated with the adjacent reconstructed video blocks is satisfied, selecting a filter based on whether the one or more conditions are satisfied, and modifying sample values in the adjacent reconstructed video blocks based on the selected filter.

In one example, a device for video coding comprises one or more processors configured to receive an array of sample values including adjacent reconstructed video blocks for a component of video data, determine whether one or more conditions associated with the adjacent reconstructed video blocks is satisfied, select a filter based on whether the one or more conditions are satisfied, and modify sample values in the adjacent reconstructed video blocks based on the selected filter.

In one example, a non-transitory computer-readable storage medium comprises instructions stored thereon that, when executed, cause one or more processors of a device to receive an array of sample values including adjacent reconstructed video blocks for a component of video data, determine whether one or more conditions associated with the adjacent reconstructed video blocks is satisfied, select a filter based on whether the one or more conditions are satisfied, and modify sample values in the adjacent reconstructed video blocks based on the selected filter.

In one example, an apparatus comprises means for receiving an array of sample values including adjacent reconstructed video blocks for a component of video data, means for determining whether one or more conditions associated with the adjacent re-constructed video blocks is satisfied, means for selecting a filter based on whether the one or more conditions are satisfied, and means for modifying sample values in the adjacent reconstructed video blocks based on the selected filter.

The details of one or more examples are set forth in the accompanying drawings and the description below. Unless explicitly stated otherwise, components and functions are optional and may be combined or subdivided, and operations may vary in sequence or may be combined or subdivided. Other features, objects, and advantages will be apparent from the description and drawings, and from the claims.

The invention claimed is:

1. A method of deblock filtering adjacent video data blocks in a video picture, the method comprising:
for each pair of adjacent video blocks:
receiving component color values for each video block in the pair;
determining whether a set of one or more conditions associated with the pair of adjacent video blocks are satisfied, the set of conditions comprising one or more conditions relating to sizes of the video blocks in the pair;
selecting, from a plurality of candidate filters to apply to chroma component color values of the pair of adjacent video blocks, one filter based on the determination of whether the set of one or more conditions is satisfied;
using the selected filter to modify the chroma component color values in the pair of adjacent video blocks;
wherein for a first pair of adjacent video blocks that share a horizontal boundary, the plurality of candidate filters comprises (i) a first filter for modifying chroma component color values in rows of chroma component color values, the rows including rows in each video block in the first pair, and (ii) a second filter for modifying chroma component color values in one row that is adjacent to the horizontal boundary in each video block in the first pair; and
wherein when the pair of adjacent video blocks share a horizontal boundary, using the selected filter to modify the chroma component color values of the pair of adjacent video blocks comprises:
using the first filter to modify at least three rows in a first video block of the pair based on:
at least four rows of the first video block of the pair, and
at least two rows of a second video block of the pair; and
using the first filter to modify at least three rows of the second video block based on:
at least four rows of the second video block, and
at least two rows of the first video block.

2. The method of claim 1, wherein conditions relating to the sizes of the video blocks comprise conditions relating to widths of the video blocks.

3. The method of claim 1, wherein the plurality of candidate filters for adjacent video blocks that share a boundary comprises at least three candidate filters for the chroma component color values.

4. The method of claim 1, wherein when the pair of adjacent video blocks share a vertical boundary, using the selected filter to the modify chroma component color values of the pair of adjacent video blocks comprises:
using the first filter to modify at least three columns in a first video block of the pair based on:
at least four columns of the first video block of the pair, and
at least two columns of a second video block of the pair; and using the first filter to modify at least three columns in the second video block based on:
at least four columns of the second video block, and
at least two columns of the first video block.

5. The method of claim 4, wherein
the first filter is a strong filter, and
the second filter is a weak filter.

6. The method of claim 1, wherein
the first filter is a strong filter, and
the second filter is a weak filter.

* * * * *